United States Patent [19]

Nakamura

[11] 4,417,021
[45] Nov. 22, 1983

[54] POLYESTER COMPOSITION AND PRODUCTION THEREOF

[75] Inventor: Katuyuki Nakamura, Nobeoka, Japan

[73] Assignee: Asahi Kasei Kogyo Kabushiki Kaisha, Osaka, Japan

[21] Appl. No.: 252,500

[22] Filed: Apr. 8, 1981

[30] Foreign Application Priority Data

Apr. 8, 1980 [JP] Japan .................................. 55-45954
Nov. 22, 1980 [JP] Japan ................................. 55-164776
Nov. 22, 1980 [JP] Japan ................................. 55-164777

[51] Int. Cl.$^3$ ............................................. C08L 67/02
[52] U.S. Cl. .................................... 524/538; 524/504; 524/539; 525/54.3; 525/69; 525/425; 525/437
[58] Field of Search ................ 525/425, 437, 69, 54.3; 524/538, 504, 539

[56] References Cited

U.S. PATENT DOCUMENTS

| | | | |
|---|---|---|---|
| 3,522,328 | 7/1970 | Caldwell | 525/425 |
| 3,591,673 | 7/1971 | Pollack | 525/425 |
| 3,884,989 | 5/1975 | Blomberg | 525/425 |
| 4,229,340 | 10/1980 | Druin | 525/425 |

Primary Examiner—Wilbert J. Briggs, Sr.
Attorney, Agent, or Firm—Sughrue, Mion, Zinn, Macpeak and Seas

[57] ABSTRACT

A polyester composition for molding having improved molding properties is disclosed, comprising 100 parts by weight of a polyester comprising mainly polyethylene terephthalate and 0.05 to 10 parts by weight of a specific type of polyamide as a nucleating agent which is uniformly dispersed in the polyester in a substantial size of 50 μm or less. A process for producing the polyester composition is also disclosed.

29 Claims, 1 Drawing Figure

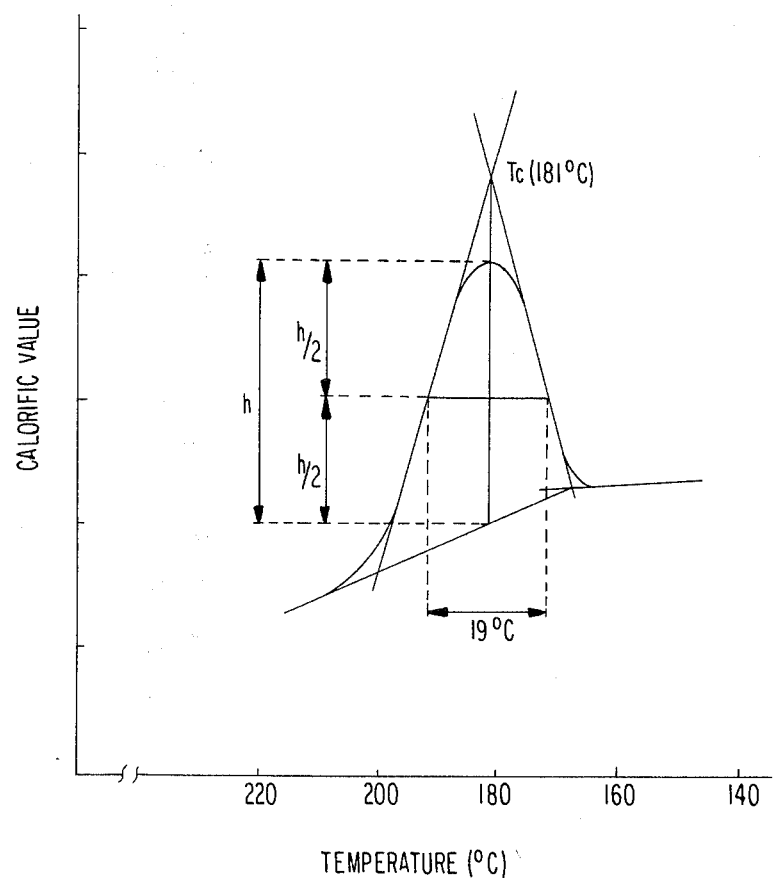

POLYESTER COMPOSITION AND PRODUCTION THEREOF

FIELD OF THE INVENTION

This invention relates to a polyester composition for molding having improved molding properties, and, more particularly, to a polyester composition having an improved polyethylene terephthalate-crystallizing rate and which is capable of providing moldings having an excellent surface and excellent physical properties even at a low mold temperature.

BACKGROUND OF THE INVENTION

Polyethylene terephthalate has been used for various products such as fibers and films, due to its excellent heat resistance, chemical resistance, electric characteristics, etc. However, in the case of using it for injection-molded plastic products, the molding work involves many limitations due to its peculiar crystallization behavior. Thus, it has been found to be seriously restricted in molding applications in spite of its excellent characteristics, because polyethylene terephthalate is an essentially crystalline polymer with a slow crystallizing rate.

SUMMARY OF THE INVENTION

As a result of intensive investigations to find a nucleating agent which functions to cause a rapid crystallization of polyethylene terephthalate (shown by the appearance of a sharp crystallization exothermic peak measurable by means of a differential scanning calorimeter (DSC) under cooling conditions) when the temperature reaches a certain level in the course of cooling polyethylene terephthalate starting from a molten state, it has now been found that crystallization of polyethylene terephthalate can be accelerated by combining polyethylene terephthalate with a specific type of polyamide. Further study has lead to the discovery that the thus obtained composition can be molded even at a low mold temperature. Thus the present invention has been achieved.

The present invention provides a moldable polyester composition comprising:

(A) 100 parts by weight of polyester comprising mainly polyethylene terephthalate and having a reduced specific viscosity ($\eta$ sp/c) of at least 0.3; and (B) from 0.05 to 10 parts by weight of at least one polyamide compound selected from (i) and (ii):

(i) at least one polyamide compound selected from polyamidohydrazides having a structure such that organic groups are linked to each other through amido bonds and hydrazido bonds, polyhydrazides having a structure such that organic groups are linked to each other through hydrazido bonds, and polyamides having a structure such that organic groups are linked to each other through amido bonds wherein organic groups other than aromatic groups are contained at least in part; and (ii) at least one polyamide compound containing an aromatic polyamido moiety comprising at least one of (1) a diamine group represented by the formula (I)

$$-NH-Ar_1-NH- \quad (I)$$

wherein $Ar_1$ represents a divalent aromatic group;

(2) a dicarboxylic acid group represented by the formula (II)

$$-CO-Ar_2-CO- \quad (II)$$

wherein $Ar_2$ represents a divalent aromatic group; and (3) an aminocarboxylic acid group represented by the formula (III)

$$-NH-Ar_3-CO- \quad (III)$$

wherein $Ar_3$ represents a divalent aromatic group; linked to each other through amido bonds, and wherein said aromatic polyamido moiety is bound to a polymer other than aromatic polyamido moiety, wherein said component (B) is uniformly dispersed in said component (A) in a substantial size of 50 μm or less, and a half width of an exothermic peak of the polyester composition measured in a crystallization temperature range by a differential scanning calorimeter at a cooling rate of 10° C./min is 15° C. or less per 8 mg of said component (A).

BRIEF DESCRIPTION OF THE DRAWING

FIGURE shows an exothermic peak temperature (Tc) and a half width (ΔT) of the exothermic peak based on crystallization of polyethylene terephthalate measured by a differential scanning calorimeter (DSC).

DETAILED DESCRIPTION OF THE INVENTION

As the polyester of component (A) comprising mainly polyethylene terephthalate, conventionally known polyesters comprising mainly polyethylene terephthalate, e.g., polyethylene terephthalate homopolymer, copolymers containing at least 70 mol% ethylene terephthalate repeating units, and polyester mixtures containing at least 70 mol% of polyethylene terephthalate can be selected. It is usually preferable to select the polyester from those having a reduced specific viscosity ($\eta$ sp/c) of at least 0.3, depending on the intended end-use.

Component (B) of the present invention functions as a nucleating agent for component (A). Polyamide compounds, component (B)-(i), are polyamides or polyhydrazides which include their homopolymers, random copolymers, block copolymers, and block or graft copolymers with other polymers. In these polyamides, polyhydrazides or copolymers, the polyamides themselves, polyamido moieties thereof, polyamidohydrazides themselves, polyamidohydrazido moieties, polyhydrazides themselves or polyhydrazido moieties preferably have a melting (or decomposition) point of not lower than 270° C., and particularly preferably, not lower than 300° C.

These are exemplified by polyamides, polyhydrazides, and copolymers thereof (polyamidohydrazides), formed by at least one of the amido unit represented by the formula (IV)

$$-NH-Ar_4-NH-CO-R_1-CO- \quad (IV)$$

wherein $Ar_4$ represents a divalent aromatic group, a divalent aralkyl group, a divalent cycloalkyl group, a methylene group or ethylene group, and $R_1$ represents a divalent alkyl group having up to 8 carbon atoms or a divalent cycloalkyl group; the amido unit represented by the formula (V)

$$-NH-R_2-NH-CO-Ar_5-CO- \quad (V)$$

wherein $Ar_5$ represents a divalent aromatic group, a divalent aralkyl group, a divalent cycloalkyl group, a methylene group or an ethylene group and $R_2$ represents a divalent alkyl group having up to 10 carbon atoms or a divalent cycloalkyl group; the amido unit represented by the following general formula (VI)

$$-NH-R_3-CO- \quad (VI)$$

wherein $R_3$ represents a divalent cycloalkyl group, a divalent aralkyl group, a cycloalkylmethylene group, a methylene group or ethylene group; the hydrazido unit represented by the formula (VII)

$$-NHNH-CO-Ar_6-CO- \quad (VII)$$

wherein $Ar_6$ represents a divalent aromatic group, a divalent cycloalkyl group or a divalent alkyl group having up to 4 carbon atoms; and the amido unit represented by the formula (VIII)

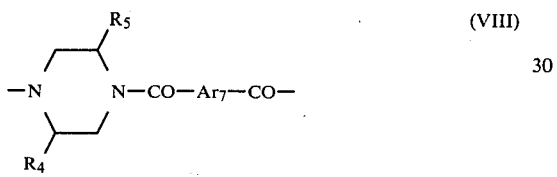

wherein $Ar_7$ represents a divalent aromatic group, and $R_4$ and $R_5$ each represents hydrogen or a methyl group.

Examples of divalent aromatic group represented by $Ar_7$ in general formula (VIII) and $Ar_4$, $Ar_5$, or $Ar_6$ in formula (IV), (V) or (VII), include p-phenylene, m-phenylene, 4,4'-biphenylene, 3,4'-biphenylene, 1,3-naphthylene, 1,4-naphthylene, 1,5-naphthylene, 1,6-naphthylene, 1,7-naphthylene, 2,6-naphthylene, 2,5-pyridylene, 2,4-pyridylene,

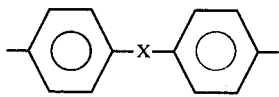

(wherein X represents $-CH_2-$, $-O-$, $-NH-$, $-CO-$, $-SO_2-$, etc.),

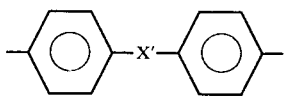

(wherein X' represents $-CH_2CH_2-$, $-N=N-$,

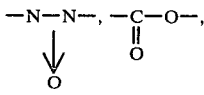

$-CH=N-$ or $-O-CH_2CH_2O-$),

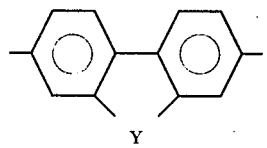

(wherein Y represents $-SO_2-$, $-CO-$, or $-CH_2-$), etc. One, two, or more of these can be selected for use. The aromatic moiety thereof may have one or more inert substituents such as a halogen atom, an alkyl group, an alkoxy group, a nitro group, and a cyano group as nuclear substituents.

Example of divalent aralkyl group represented by $Ar_4$, $Ar_5$ or $R_3$ in general formula (IV), (V) or (VI) include

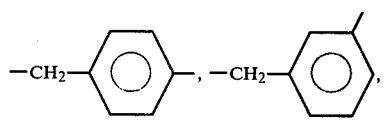

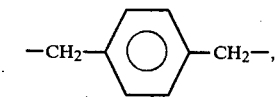

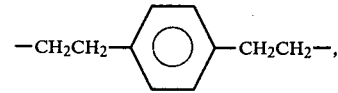

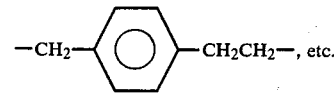

Examples of the amido unit represented by formula (IV) include:

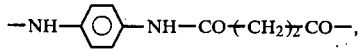

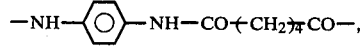

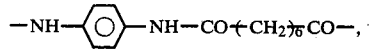

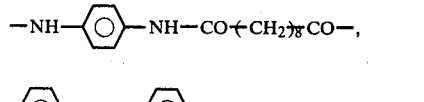

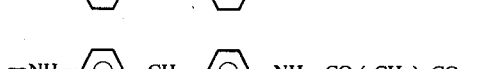

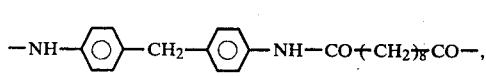

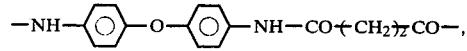

-continued
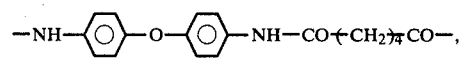
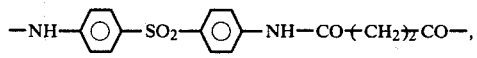
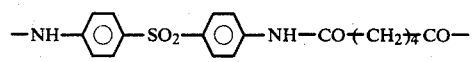
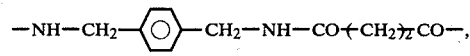
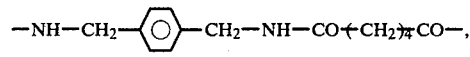
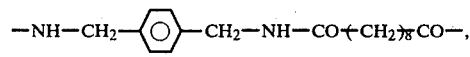
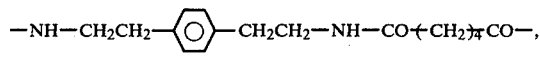
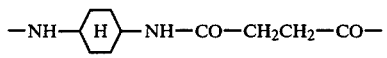
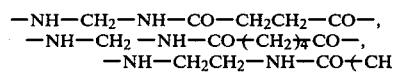
Examples of the amido unit represented by formula (V) include:
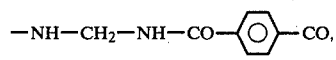
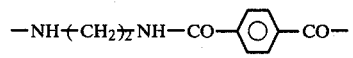
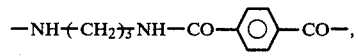
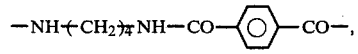
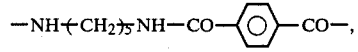
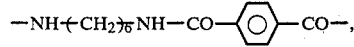
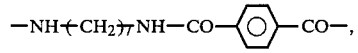
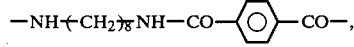
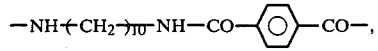
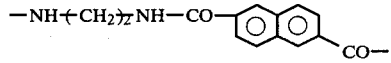
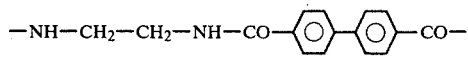
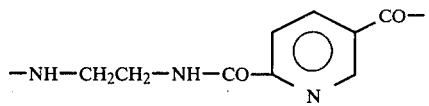
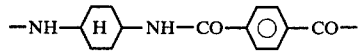
Examples of the amido unit represented by formula (VI) include:
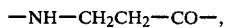
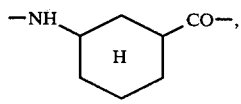
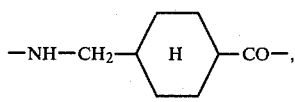
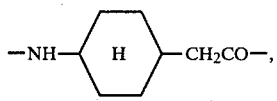
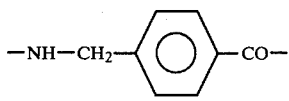
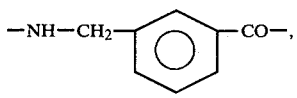
Examples of the hydrazido unit represented by formula (VII) include:
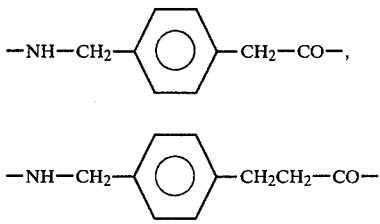
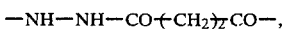
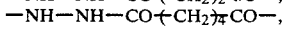
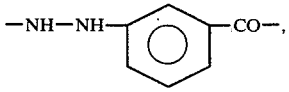

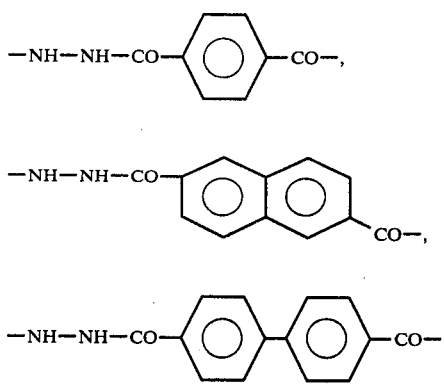

Examples of the amido unit represented by formula (VIII) include:

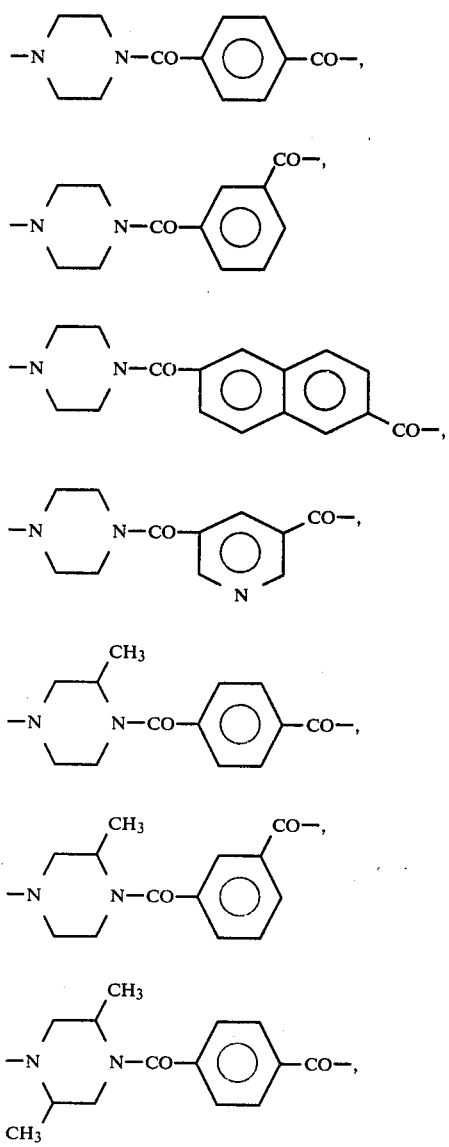

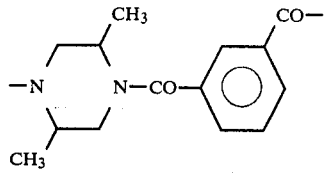

The aromatic polyamide, component (B)-(ii), is at least one aromatic polyamide compound containing an aromatic polyamido moiety comprising at least one of (1) a diamine group represented by the formula (I)

—NH—Ar$_1$—NH—     (I)

wherein Ar$_1$ represents a divalent aromatic group; (2) a dicarboxylic acid group represented by the formula (II)

—CO—Ar$_2$—CO—     (II)

wherein Ar$_2$ represents a divalent aromatic group, and (3) an aminocarboxylic acid group represented by the formula (III)

—NH—Ar$_3$—CO—     (III)

wherein Ar$_3$ represents a divalent aromatic group; linked to each other through amido bonds, and wherein said aromatic polyamido moiety is bound to a polymer other than aromatic polyamido moiety.

Examples of said divalent aromatic group represented by Ar$_1$, Ar$_2$ or Ar$_3$ in said formula (I), (II) or (III) include p-phenylene, m-phenylene, 4,4'-biphenylene, 3,4'-biphenylene, 1,3-naphthylene, 1,4-naphthylene, 1,5-naphthylene, 1,6-naphthylene, 1,7-naphthylene, 2,6-naphthylene, 2,5-pyridylene, 2,4-pyridylene,

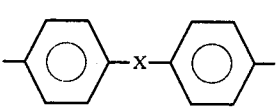

(wherein X represents —CH$_2$—, —O—, —NH—, —CO—, —SO$_2$, etc.),

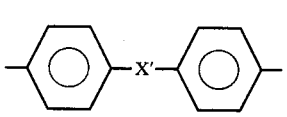

(wherein X' represents —CH$_2$CH$_2$—, —N=N—,

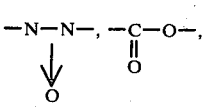

—CH=N— or —OCH$_2$CH$_2$O—),

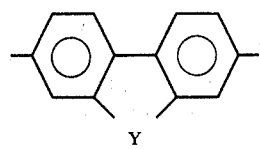

(wherein Y represents —SO$_2$—, —CO—, or —CH$_2$—), etc. One, two or more of these are selected for use. The aromatic moiety thereof may have one or more inert substituents such as a halogen atom, an alkyl group, an alkoxy group, a nitro group, or a cyano group as nucleating substituents.

Examples of the aromatic polyamido moiety formed from formulae (I) and (II) include:

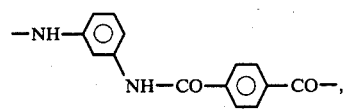

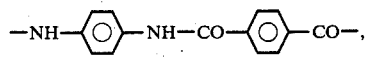

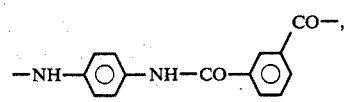

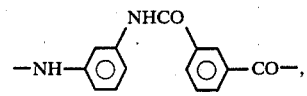

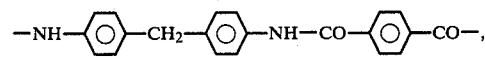

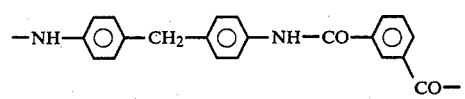

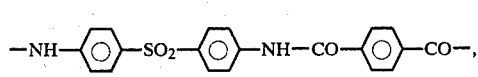

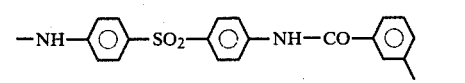

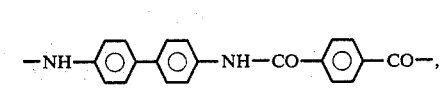

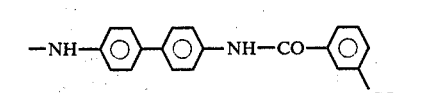

-continued

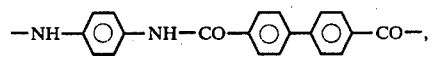

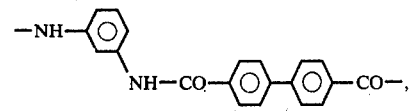

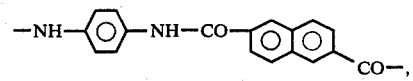

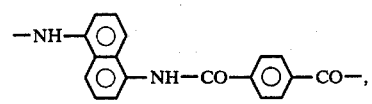

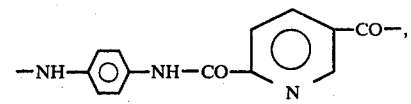

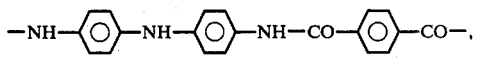

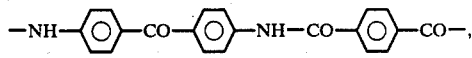

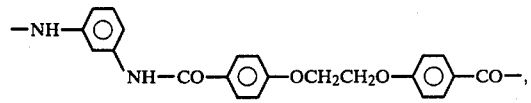

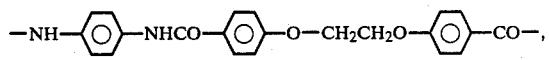

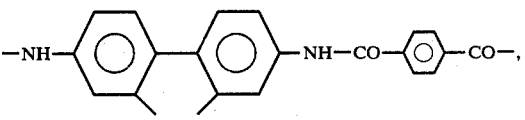

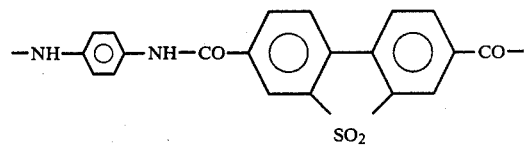

Examples of the amido unit represented by formula (III) include

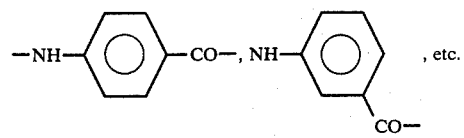

Other amido units or hydrazido units may also be used, provided that they do not interfere with the nucleating function of component (B).

These polyamido moieties, polyaminohydrazido moieties, polyhydrazido moieties, and aromatic polyamido moieties permit reduction in the degree of polymerization thereof while not decreasing the melting point below 270° C., and particularly preferably not below 300° C. The number of the amido units and the hydrazido units are at least 2, and preferably not less than 5, in terms of sum of the number of amido bonds and hydrazido bonds contained therein.

The polyamide compound, component (B)-(i), may be blocked at its terminal end with a monofunctional compound or another polymer.

Component (B)-(ii) is bound to another polymer at the terminal end of the aromatic polyamido moiety.

As the above-described monofunctional compound, there are illustrated, for example, amino compounds, phenol compounds, carbonyl halide compounds, carboxylic acid compounds, epoxy compounds, isocyanate compounds, etc. and, as the above-described another polymer, various polymers can be used, such as polycondensation polymers or copolymers (e.g., polyesters, polyamides, polyethers, polysiloxanes, polyurethanes, polycarbonates, polysulfones, etc.), vinyl polymers (e.g., polystyrene and the copolymers thereof, polyacrylates and the copolymers thereof, polymethacrylates and the copolymers thereof, polyvinyl acetate and the copolymers thereof, etc.), and cellulose polymers (e.g., cellulose diacetate, ethyl cellulose, etc.).

Formation of bonds between the polyamides, polyhydrazides or aromatic polyamido moieties functioning as nucleating agents and polymers other than these polymers is attained by utilizing the amino group, carboxyl group or chlorocarbonyl group contained in the polyamides, polyhydrazides or aromatic polyamide moieties functioning as nucleating agents or by converting the amino group or amido group thereof to a metal salt ($>N^+M^-$ wherein M represents sodium or potassium), and causing reaction between these groups and reactive groups such as an amino group, a hydroxy group, a carboxyl group, a carboxylic anhydride group, a halogenocarbonyl group, an epoxy group, an isocyanato group, a halogen atom, etc. introduced in the polymers to be bonded with the polyamides, polyhydrazides or aromatic polyamido moieties.

The thus-obtained polyamides, polyhydrazides or aromatic polyamide moieties to be used as component (B) in the present invention contain polyamido moiety, polyamidohydrazido moiety, polyhydrazido moiety or aromatic polyamido moiety functioning as a nucleating agent in a state of being bound blockwise or graftwise to other polymers which serve to prevent more aggregation than is necessary to form too large aggregates due to the strong aggregating force of the polyamido moiety, polyamidohydrazido moiety, polyhydrazido moiety or aromatic polyamido moiety. Thus, component (B) can be suitably dispersed in component (A) of polyester comprising mainly polyethylene terephthalate.

As the other polymer to be bound to the polyamide, polyhydrazide, or aromatic polyamido moiety, those which have an excellent kneadability with component (A) are most desirable. Therefore, particularly preferable examples of the other polymers include polyesters, polymethacrylates, polystyrene, cellulose derivatives, etc.

The polyester composition of the present invention can be prepared by dispersing component (B) in component (A) by conventional means so that a half width of an exothermic peak measured in a polyethylene terephthalate-crystallizing temperature range by means of a DSC at a gradual cooling rate of 10° C./min becomes 15° C. or less. In the composition, component (B) is used as a nucleating agent for component (A).

The DSC measurement can be conducted in a conventional manner by using a commercially available apparatus of, for example, model DSC II made by Perkin Elmer Co. For example, a sample weighing 8 mg as to component (A) is heated to a temperature higher than the melting point of component (A) in a nitrogenous atmosphere to completely melt the polyester sample comprising mainly polyethylene terephthalate, then cooled at a given rate to record an exothermic peak accompanied by the crystallization. Such differential measurement of polyethylene terephthalate shows that the exothermic peak resulting from crystallization appears in the range of from 180° C. to 210° C. when cooling is conducted at a rate of 10° C./min. However, this exothermic peak is usually so broad that "the half width of the peak" (that is, the width at a height one-half the distance from a base line to the top of the peak) is about 20° C. as shown in FIGURE.

When the cooling rate is accelerated, the exothermic peak based on the crystallization will further shift to the low temperature side, with the half width becoming broader and, at a cooling rate of 80° C./min, the exothermic peak generally shifts to from 150° C. to 160° C. with a half width of more than 30° C.

When the cooling rate is more accelerated, the exothermic peak based on the crystallization will become much broader until substantially no peak is observed.

Polyethylene terephthalate, which shows such a broad half width of exothermic peak based on the crystallization even in the above-described gradual cooling, will be cooled and solidified almost without crystallization in the portions brought into contact with a metal mold surface in molding using an ordinary metal mold, because the cooling rate of molten polyethylene terephthalate at the metal mold surface is as fast as 300°–400° C./min.

In contrast, the composition of the present invention shows an exothermic peak at from 200° C. to 220° C. based on crystallization in the course of cooling to conduct DSC measurement when cooled at a rate of 10° C./min, that is, it has a crystallizing temperature shifted to the higher temperature side. In addition, the exothermic peak is extremely sharp. The half width of this peak is at least not more than 15° C., preferably not more than 10° C. Compositions showing a half width of 8° C. or less have particularly excellent properties.

In cooling at a rate of 80° C./min, the composition of the present invention shows an exothermic peak between 170° C. and 210° C. based on the crystallization, with a half width of 22° C. or less, preferably 20° C. or less, and particularly preferably 18° C. or less.

Therefore, the composition of the present invention undergoes rapid crystallization even when rapidly cooled in a metal mold, thus providing well crystallized homogeneous moldings having good physical properties.

As is common with ordinary compositions, the composition of the present invention requires individual components constituting the composition to be uniformly dispersed therein. As a method for dispersing component (B) in component (A) in a highly fine-dispersed state, there is, for example, a method of first mechanically crushing, pulverizing or milling the solid polyamide, component (B), having been prepared by various known processes to form a super-fine or microfibril state, then mixing them with a solution of, or molten state, polyester comprising mainly polyethylene terephthalate. In the case of crushing component (B) by mechanical means until it exhibits sufficient effects as a nucleating agent, it is also possible to use a nonsolvent for depressing heat generation or for aiding to attain uniform dispersion of component (B), or to crush in the presence of additives (e.g., plastilizers, inorganic fillers, lubricants, etc.) or polymers which have been conventionally used for polyethylene terephthalate.

The composition of the present invention can be also prepared by adding, to a solution in a solvent of component (B) prepared by known processes or a component (B) solution or suspension as produced in the production step, a poor solvent therefor to form a finely dispersed precipitate, isolating it by filtration or centrifugation, and mixing them with a solution of component (A) or in molten component (A) or, without isolation, by replacing the solvent by a solvent for polyethylene terephthalate and dissolving therein component (A) followed by causing co-precipitation in a poor solvent for polyethylene terephthalate.

Solvents that can be used in the step for dissolving or producing component (B) include high polar non-reactive solvents, for example, dimethylformamide, dimethylacetamide, tetramethylurea, hexamethylphosphoramide, N-methylpyrrolidone, N-methylcaprolactam, dimethyl sulfoxide, and the mixtures thereof. If necessary, mixtures with other solvents such as nitrobenzene, tetrahydrofuran, dioxane, tetrachloroethane, chloroform, phenol, etc., may also be used. Further, inorganic salts such as calcium chloride or lithium chloride may be added to raise the solubility thereof. As the solvent for dissolving component (B), formic acid, concentrated sulfuric acid or fuming sulfuric acid may also be used.

As the poor solvent, various solvents can be used, such as water, methanol, ethanol, acetone, ethylene glycol, hexane, o-chlorophenol, nitrobenzene, tetrachloroethane, phenol, etc., and the mixtures thereof, with water and methanol being preferable.

In dispersing component (B) in a finely dispersed state using the above-described solvents and poor solvents, desired size and form can be attained by properly selecting the concentration of the solution, combination of said solvent and poor solvent, and mechanical dispersing force upon mixing. Examples of the mechanical dispersing method include a method of using a high-speed stirrer, mixer, homogenizer or the like, a method of irradiating with ultrasonic waves, and a method of blowing component (B) into a poor solvent in a spray form.

Further, the composition of the present invention can be prepared by mixing the solution or dispersion of component (B), which is mixed with a poor solvent in the aforesaid process, with a dispersing aid, and mixing the resulting mixture with a poor solvent to cause co-precipitation of component (B) and the dispersing aid, or by dissolving in, or mixing with, a poor solvent a dispersing aid and mixing it with a solution or dispersion of component (B) to cause co-precipitation of component (B) and the dispersing aid, followed by mixing or kneading the co-precipitate as produced, or after filtration or washing, with component (A) in a dissolved or molten state.

The dispersing aid serves to prevent unnecessary aggregation to form large aggregates and solidification where only component (B) exists, and serves to facilitate dispersion of component (B) in polyethylene terephthalate in a finely dispersed state.

For the sake of convenience, the dispersing aids which are advantageous in surface property and physical properties of the resulting moldings when incorporated in component (A) are preferable, although those which cause no or only slight adverse effects can be used.

Examples of the dispersing aid include polyethylene terephthalate (and a copolymer thereof, starting material thereof and oligomers thereof), other polymers, plasticizers, surfactants, flame-retardants, antioxidants, stabilizing agents against heat or light, lubricants, reinforcing agents, extenders, etc. Specific examples of the dispersing aid include phosphoric esters (e.g., tricresyl phosphate, tris(2,3-dibromopropyl) phosphate, triphenyl phosphate, tributyl phosphate, etc.), esters (e.g., dibutyl phthalate, dimethyl terephthalate, dibutyl terephthalate, dipropyl terephthalate, dimethyl phthalate, di-2-ethylhexyl phthalate, dibutyl adipate, 2-ethylbutyl azelate, dioctyl sebacate, ethylene glycol dibenzoate, neopentyl glycol dibenzoate, triethylene glycol dibenzoate, butylphthalylbutyl glycolate, butyl p-acetylbenzoate, etc.), halides (e.g., chlorinated paraffin, tetrabromobutane, hexabromobenzene, decabromodiphenyl ether, tetrabromobisphenol, etc.), phenols (e.g., 2,6-di-tert-butyl-p-cresol, 2,2'-methylene-bis(4-methyl-6-tert-butylphenol), tetrakis(methylene-3-(3',5'-di-tert-butyl-4'-hydroxyphenyl)propionato)methane, p-octylphenyl salicylate, etc.), benzophenones (e.g., 2-hydroxy-4-methoxybenzophenone, 5-chloro-2-hydroxybenzophenone, etc.), metal salts (e.g., sodium laurate, potassium stearate, cadmium stearate, dibutyltin, lead maleate, calcium alkylbenzenesulfonate, etc.), alcohols (e.g., stearyl alcohol, polyoxyethylene nonylphenol ether, polyoxyethylene monocetyl ether, glycerol monostearate, etc.), polyesters or the oligomers thereof (e.g., polyethylene terephthalate and the copolymer thereof, bishydroxyethyl terephthalate, polybutylene terephthalate and the copolymer thereof, polyethylene adipate, polyethylene sebacate, polyhexamethylene terephthalate, polycaprolactone, etc.), polyamides (e.g., nylon 6, nylon 66, nylon 12, etc.) polycarbonates, polysulfones, polysulfides, silicon resins or silicone oil, vinyl polymers and copolymers (e.g., polymethacrylates, polyacrylates, ethylene-vinyl acetate copolymer, polystyrenes, etc.), polyoxytetramethylene, polyoxypropylene, polyoxyethylene, polyphosphazens, epoxy resins, cellulose polymers or oligomers (e.g., cellulose acetate, ethyl cellulose, nitrocellulose, etc.), and inorganic fibers and inorganic powders (e.g., glass fiber, carbon fiber, potassium titanate fiber, zinc borate, barium metaborate, silica, talc, titanium oxide, antimony oxide, etc.). These various materials are properly selected depending upon the purpose. Of these, particularly preferable dispersing aids are polymers (e.g., polyesters and the oligomers thereof, polymethacrylates, polystyrenes, cellulose acetate, etc.) and surfactants. The dispersing aid is used in an amount of from 0.5 to 10 parts by weight per part by weight of component (B).

The composition of the present invention can also be prepared by dispersing component (B) having been finely dispersed according to the aforesaid process, in a starting material for component (A) or an intermediate for the final polymer, and subjecting the resulting mixture to the first or intermediate step of polymerization to prepare component (A).

Of the above-described processes to finely disperse component (B) in component (A), preferable results are obtained by the process of using a dispersing aid.

Various other processes are also applicable as long as they enable the attainment of the objects of the present invention. Also, a process of using a composite of component (A) and component (B), obtained by the above-described process, as a master batch, and further blending or kneading it with component (A) to adjust the content of component (B) to a predetermined level is industrially advantageous.

Component (B) is extremely finely dispersed in the thus-obtained composite of components (A) and (B) of the present invention in the form of branched or intertwined microfibrils, complete fine microfibrils, needle-like or particulate state fundamentally having a size (diameter or length) of not more than 50 μm. Compositions providing preferable effects contain component (B) particles ranging from about several μm to about several ten Å in size.

As to blending ratio, component (A) and component (B) of the present invention are to be compounded so that the effect of accelerating crystallization of polyester comprising mainly polyethylene terephthalate is obtained, or that the half width of exothermic peak based on crystallization by gradual cooling and measured by a DSC at a cooling rate of 10° C./min becomes 15° C. or less per 8 mg of said component (A). The weight ratio range of component (B) described above varies depending upon the properties of components (A) and (B) and the dispersed state (e.g., size, shape, etc.) of component (B), and hence it is difficult to show the blending ratio of component (A) to component (B) by weight, but, in general, from 0.05 to 10 parts by weight, and preferably from 0.1 to 5 parts by weight, of component (B) is compounded with 100 parts by weight of component (A). In the case of using component (A), e.g., polyethylene terephthalate, as the dispersing aid, component (B) is blended in the above amount based on 100 parts by weight of the total component (A) in the resulting polyester composition.

When component (B) is incorporated in component (A) in a homogeneous, finely dispersed state, the amount of component (B) may be not more than 3 parts by weight, with 0.1 to 3 parts by weight being the most preferable.

The composition of the present invention containing components (A) and (B) as necessary components may further contain various additives such as reinforcing fillers, plasticizers, antioxidants, UV ray-absorbing agents, lubricants, parting agents, flame-retardants, antistatistics, colorants, etc., according to the end-use.

The thus-obtained composition of the present invention is suited as a molding material, showing good molding properties in molding in a low-temperature (not higher than 120° C., preferably around 100° C.) metal mold as well as in molding in a high-temperature metal mold.

In molding, combined use of the composition of the present invention and a reinforcing filler is extremely effective for improving shape stability, heat resistance, and mechanical characteristics of resulting moldings, with maintaining the original merits of the composition of the present invention, thus being particularly preferable. As such reinforcing filler, there are illustrated fibrous materials such as glass fiber, potassium titanate fiber, asbestos fiber, poly-p-phenyleneterephthalamide fiber, carbon fiber, etc., and non-fibrous inorganic materials such as mica, aluminum silicate, glass beads, glass flake, silica, talc, etc. Of these, glass fiber is particularly preferable. The amount of the reinforcing fiber to be compounded varies depending upon the desired end-use, but, in general, it ranges from 2 to 200 parts by weight, and preferably 4 to 100 parts by weight, per 100 parts by weight of component (A). If the amount is less than 2 parts by weight, sufficient effects of improving form stability or physical properties are not obtained, whereas if it is more than 200 parts by weight, deterioration results, such as in increased fragility and deteriorated molding properties.

In the present invention, combined use of a plasticizer is preferable for improving molding properties and surface lubricity of the resulting moldings (that is, molded articles formed from the polyester composition of the invention). As such plasticizers, appropriate plasticizers may be selected from various known compounds. Examples thereof include phosphates (e.g., triphenyl phosphate, tricresyl phosphate, tricyclohexyl phosphate, triisopropyl phosphate, octyldiphenyl phosphate, triethyl phosphate, etc.), phosphites (e.g., triphenyl phosphite, tributyl phosphite, trimethyl phosphite, etc.), phosphonates (e.g., phenyl phenylphosphonate, diphenyl phenylphosphonate, etc.), phosphines (e.g., phenylphosphinic acid, methyl dimethylphosphinate, phenyl methylphosphinate, etc.), benzoic esters (e.g., polyethylene glycol dibenzoate, polypropylene glycol dibenzoate, polytetramethylene glycol dibenzoate, diethylene glycol dibenzoate, triethylene glycol dibenzoate, dipropylene glycol dibenzoate, neopentyl glycol dibenzoate, glyceryl tribenzoate, trimethylolethane tribenzoate, phenyl benzoate, pentaerythritol tetrabenzoate, bishydroxyethyl terephthalate dibenzoate, etc.), esters (e.g., dioctyl phthalate, diisodecyl phthalate, diisopropyl isophthalate, di-2-ethylhexyl isophthalate, etc.), polyesters (e.g., ethylene adipate/terephthalate copolyester, propylene adipate/terephthalate copolyester, etc.) and the oligomers thereof, epoxy compounds obtained from phenols (e.g., hydroquinone, resorcin, pyrogallol, 4,4'-dihydroxydiphenyldimethylmethane, 4,4'-dihydroxydiphenyldimethylsulfone, etc.) and epichlorohydrin, epoxy compounds obtained from alcohols (e.g., 1,4-butanediol, 1,6-hexanediol, glycerin, pentaerythritol, diethylene glycol, polyethylene glycol, polytetramethylene glycol, etc.) and epichlorohydrin, epoxy compounds obtained from carboxylic acids (e.g., adipic acid, succinic acid, isophthalic acid, terephthalic acid, etc.) and epichlorohydrin, polyoxyalkylenes (e.g., polyoxyethylene, polyoxypropylene, polyoxybutylene, etc.), benzophenone, 4-fluorobenzophenone, diphenylsulfone, N-ethyl-o,p-toluenesulfonamide, tolylsulfoxide, laurylnitrile, erucylnitrile, etc.

The composition of the present invention contains component (A) and component (B) as necessary components, with component (B) showing a nucleating effect of accelerating crystallization of component (A). Therefore, the composition of the present invention enables the conducting of molding, and particularly injection-molding, at a metal mold temperature of less than 120° C., and particularly at about 100° C., which has been impossible with conventional polyethylene terephthalate, as well as to conduct molding in a high-temperature metal mold. Thus, it has the great significance of expanding the application range of polyethylene terephthalate as an industrially useful resin, in cooperation with its desirable heat resistance and chemical resistance properties.

In addition, the composition can find application as a material for film, fiber, or like molding obtained by extrusion molding or blow molding.

The present invention will now be described in more detail by reference to Examples. Additionally, DSC measurement, molding, and evaluation of sample pieces were conducted as follows.

(1) DSC measurement:

Samples containing 8 mg of component (A) were used: for example, even in the case of compounding glass fiber, samples containing 8 mg as component (A) were weighed out for use. As a measuring apparatus, Model DSC-II manufactured by Perkin Elmer Co. was used. Measurement was conducted in a nitrogenous atmosphere as follows. Samples were heated to 290° C., and, after maintaining at that temperature for 5 minutes, cooled at a definite rate of 10° C./min. Exothermic peak temperature (Tc) and half width ($\Delta T$) of the peak were determined from the exothermic peak obtained based on crystallization of component (A), as shown in Figure.

(2) Kneading by means of a biaxial screw extruder:

Components (A) and (B) and, if necessary, other additives were blended in given proportions in a rotary drum blender. The resulting blend was pelletized by extruding at from 260° C. to 270° C. using a 30-mm biaxial screw extruder. The thus-obtained pellets were vacuum-dried at 130° C. for 5 hours.

(3) Kneading by means of a uniaxial screw extruder:

Samples with a predominant compounding ratio were blended in a rotary drum blender and pelletized by extruding at 260° C. to 270° C. using a uniaxial screw extruder. The resulting pellets were vaccum-dried at 130° C. for 5 hours.

(4) Molding of sample pieces:

The pellets obtained in (2) or (3) described above were molded using model KC-20 made by Kawaguchi Tekko K.K. under molding conditions of 270° C. to 280° C. in cylinder temperature, a given temperature in metal mold temperature, and a molding cycle of 25 seconds.

(5) Parting properties and appearance:

Parting properties were evaluated based on the ease with which the molding was taken out of the cavity and with which a sprue was removed. Appearance was evaluated based on the surface gloss and presence or absence of pock marks, as follows:

A: good, B: fairly good; X: unsatisfactory (6) Measurement of tensile strength:

Dumbbell specimens (dumbbell type-1 of ASTM) were molded according to process (4), and tensile strength was measured according to ASTM-D-638 using them.

Observation of component (B) in the composition:

A slight amount of the composition obtained in each Example was sandwiched between cover glasses, placed on a hot plate, heated to from 270° C. to 300° C. to melt, and pressed while in a molten state to reduce the thickness. (1) When rapidly cooled between cool black bodies, polyethylene terephthalate in the composition was maintained in an amorphous state without undergoing crystallization. The thus obtained samples were observed under a polarizing microscope. (2) Further, each of the samples was subjected to a heating stage and was observed under the polarizing microscope while heating it.

Results obtained are as follows: In observation (2), component (B) was not melted in every Example and the size and shape of particles thereof were recognized in both the case of heating the composition further to from 270° C. to 300° C. after melting component (A) polyethylene terephthalate and the case of heating to higher than 300° C. (to about 310° C.).

Observations were made of the size, shape, and dispersed state of component (B) according to (1) and (2) described above with 100-300X magnification.

Results thus obtained were categorized into the following types:

(a): Particles of indefinite or particulate form were predominant, most of which were as small as 1 $\mu$m or less and were dispersed apart;

(b): Particles of indefinite or particulate form were mostly 1 to 5 $\mu$m in size and dispersed apart;

(c): Particles of indefinite or particulate form having a size of about 5 to 10 $\mu$m or, in some cases, about 20 to 30 $\mu$m, were observed here and there, with particles of 2 or 3 $\mu$m or less than 1 $\mu$m being dispersed apart.

Results of the observations of the compositions in Examples, categorized by the above-described types, are as follows.

Compositions of type (a):
  Examples 43 and 56
Compositions of type (b):
  Examples 1-18, 22-24, 27-37, 44, 45, 47, 50, 57, 58, 60 and 63-69
Compositions of type (c):
  Examples 19-21, 25, 26, 38-42, 46, 48, 49, 51-55, 59, 61 and 62

Reference Example 1

Polyethylene terephthalate having a reduced specific viscosity ($\eta$ sp/c) of 0.61 (measured in a tetrachloroethane/phenol (4/6) mixture solvent) was dried to measure the exothermic peak temperature and half width of the peak based on crystallization thereof by DSC measurement. Particularly, when 8 mg of the polyethylene terephthalate was heated at a heating rate of 10° C./min, an endothermic peak of melting point (Tm) was observed at 255° C. Heating was further continued to 290° C. and, after maintaining this temperature for 5 minutes, the polymer was cooled at a rate of 10° C./min. The relation between the temperature and calorific value is generally shown by the curve of Figure. Half width of the exothermic peak was determined from the graph as follows. The exothermic peak temperature (Tc) based on crystallization was read 181° C. Width of the peak was measured as the width between two points corresponding to ½ of the height of the peak (h). This width was regarded as the half width ($\Delta T$) of the exothermic peak. As a result, $\Delta T$ was found to be 19° C.

When the measurement was repeated by changing the cooling rate to 80° C./min, Tc was shifted to 150° C. and $\Delta T$ expanded to as broad as 36° C.

When this polyethylene terephthalate was molded in metal molds at 100° C., 110° C. and 120° C., there resulted extremely poor parting properties (evaluated as X) and rough appearance of the molding (evaluated as X). Moldings with passable parting properties and good appearance (evaluated as A) were obtained only by raising the metal mold temperature to 150° C.

Reference Example 2

A 30 wt% amount of glass fiber (glass chipped strand of 3 mm in length) was kneaded with polyethylene terephthalate (PET) of 0.72 in $\eta$ sp/c using a uniaxial extruder. The same test procedures as in Reference Example 1 were conducted to obtain results given in Table 1.

Reference Example 3

2 kg of polyethylene terephthalate having a η sp/c of 0.61, 60 g of talc and 880 g (30%) of glass fiber were kneaded in a uniaxial screw extruder and molded. The thus obtained moldings were evaluated to obtain the results reported in Table 1.

Reference Example 4

2 kg of polyethylene terephthalate having a η sp/c of 0.72, 40 g of talc, and 880 g (30%) of glass fiber were kneaded in a uniaxial screw kneader and molded. The thus obtained moldings were evaluated to obtain the results reported in Table 1.

TABLE 1

| Reference Example No. | PET η sp/c | Metal Mold Temp. (°C.) | DSC Tc | ΔT | Parting Properties | Appearance | Tensile Strength (Kg/cm$^2$) |
|---|---|---|---|---|---|---|---|
| 2 | 0.72 | 100 | 185 | 23 | X | X | — |
|   |      | 110 |     |    | X | X | — |
|   |      | 120 |     |    | X | X | — |
|   |      | 150 |     |    | A | A | 1360 |
| 3 | 0.61 | 100 | 201 | 16 | X | X | — |
|   |      | 110 |     |    | X | X | — |
|   |      | 120 |     |    | X | X | — |
|   |      | 150 |     |    | A | A | 1060 |
| 4 | 0.72 | 100 | 198 | 17 | X | X | — |
|   |      | 110 |     |    | X | X | — |
|   |      | 120 |     |    | X | X | — |
|   |      | 150 |     |    | A | A | 1350 |

EXAMPLE 1

(1) A 1-liter reactor equipped with a high-speed stirrer was well dried by introducing hot dry nitrogen gas thereinto, and then cooled. 100 ml of dry, purified hexamethylphosphoramide, 150 ml of N-methyl-2-pyrrolidone, and 8 g of anhydrous lithium chloride were charged therein, and 2.25 g of p-phenylenediamine was added thereto and completely dissolved therein.

Then, this solution was cooled to 5°–10° C. and, under vigorous stirring, 4.27 g of terephthalic acid dichloride was added thereto. After reacting for about one hour, the temperature of the solution was raised to 30°–40° C., reaction being continued for another one hour.

A part of the thus produced poly-p-phenyleneterephthalamide was removed from the reaction system, precipitated in water, repeatedly washed with warm water, and dried for measuring viscosity. As a result, relative viscosity (η rel) measured at 35° C. as a 0.2 g/100 ml solution in 97% conc. sulfuric acid was found to be 1.90, and mean polymerization degree about 80.

Then, 6.47 g of ethylene glycol and 4.2 g of a sodium hydride dispersion were added to the above-described reaction mixture and, after stirring for one hour, 21.1 g of terephthalic acid dichloride was added thereto, reaction being continued for 4 hours under vigorous stirring. Then, this reaction mixture was poured into a large amount of methanol to precipitate the product followed by filtration. The filtrate was repeatedly washed with hot ethanol, then successively with warm water and acetone, and dried. Thus, there was obtained 22.1 g of a product containing about 23% (determined based on elemental analysis) poly-p-phenyleneterephthalamido component.

(2) o-chlorophenol was added to 10 g of the thus obtained product and heated to dissolve soluble substances followed by filtration. The o-chlorophenol insolubles were further washed with o-chlorophenol, repeatedly washed with ethanol, and dried to obtain 3.4 g of a solid substance. Elemental analysis of this substance revealed that it was a block copolymer comprising 50 repeating units of polyethylene terephthalate per 80 repeating units of poly-p-phenyleneterephthalamide. Additionally, aforesaid o-chlorophenol solubles were all polyethylene terephthalate.

(3) 0.075 g of the o-chlorophenol-insoluble block copolymer obtained in (2) was added to a solution of 3 g of lithium chloride in 100 ml of hexamethylphosphoramide and dissolved therein by heating. The resulting solution was poured into a nitrobenzene solution containing 5 g polyethylene terephthalate used in Reference Example 1 and vigorously stirred. Then, the mixture was cooled, and a large amount of methanol was added thereto to isolate the polymer by precipitation.

Then, the polymer precipitate was collected by filtration, repeatedly washed with methanol, and dried to obtain a mixture of polyethylene terephthalate and block copolymer. This mixture contained about 1 wt % poly-p-phenyleneterephthalamido block component. DSC measurement of the thus obtained blend revealed that the temperature corresponding to exothermic peak based on crystallization of polyethylene terephthalate, Tc, was 215° C., and the half width of the peak (ΔT) was 5.3° C.

EXAMPLE 2

1.1 g of the reaction product (corresponding to about 0.37 g of o-chlorophenol-insoluble block copolymer) obtained in the same manner as in Example 1-(1) was kneaded with 50 g of polyethylene terephthalate used in Reference Example 1 in a nitrogenous atmosphere at 260°–280° C. using a small-sized kneading tester, taken out, and cooled. DSC measurement of this blend in the same manner as in Reference Example 1 revealed that the temperature of the exothermic peak based on the crystallization was 213° C., and that the peak had a half width of 5.5° C. Additionally, the content of poly-p-phenyleneterephthalamido block component based on polyethylene terephthalate was about 0.5 wt %.

EXAMPLE 3

2.2 g of the reaction product obtained in the same manner as in Example 1-(1) was kneaded with 50 g of the same polyethylene terephthalate as used in Reference Example 1 and 10 g of glass fiber as in Example 2. DSC measurement of the thus obtained blend revealed that the temperature for the exothermic peak based on the crystallization was 215° C. and the half width of the peak 5.3° C. Additionally, the content of poly-p- phenyleneterephthalamido component based on polyethylene terephthalate was about 1 wt%.

EXAMPLE 4

(1) 150 ml of N-methylpyrrolidone, 100 ml of N,N-dimethylacetamide, and 2.15 g of p-phenylenediamine were charged in the same reactor as used in Example 1-(1) and, after dissolving, 4.44 g of terephthalic acid dichloride was added thereto at 5°–10° C. under vigorous stirring followed by reacting for 2 hours. When a slight amount of the reaction product was taken out to measure viscosity as in Example 1, relative viscosity ($\eta$ rel) was determined to be 0.90, and mean polymerization degree about 10.

(2) To the reaction mixture obtained in (1) were added 23 g of polyethylene terephthalate oligomer of about 10 in mean polymerization degree having hydroxyl groups at both terminal ends (bishydroxyethyl terephthalate lower polymer) and 150 ml of N,N-dimethylacetamide. After further adding thereto 1 g of a sodium hydride dispersion, the reaction system was raised to 80°–100° C. to react for 2 hours. After completion of the reaction, the cooled reaction mixture was poured into a large amount of methanol, and the precipitate thus formed was washed with successive, methanol, ethanol, water, and acetone, and dried to obtain 24.3 g of a block copolymer. Elemental analysis of this copolymer revealed that it contained about 19% poly-p-phenyleneterephthalamido block component.

(3) 4 g and 8 g portions of the block copolymer obtained in (2) were respectively mixed in a molten state with 50 g of polyethylene terephthalate to prepare two compositions.

These compositions respectively contained about 1.5% and about 3% of poly-p-phenyleneterephthalamido block component. DSC measurement thereof revealed that the temperatures for the exothermic peak based on the crystallization were 210° C. and 208° C., respectively, with the half widths of the peaks being 5.7° C. and 6.5° C., respectively.

Example 5

(1) 10 mg of antimony oxide and 20 mg of triphenyl phosphite were added to 10 g of the reaction product obtained in Example 4-(2), and the resulting mixture was heated in vacuo up to 280° C. to conduct polymerization. o-chlorophenol solubles of the thus obtained polymer had a reduced specific viscosity of 0.58. Elemental analysis of the polymer revealed that the content of poly-p-phenyleneterephthalamido block component in the polymer was about 19.5%.

(2) 2 g of this polymer was kneaded in a molten state with 50 g of polyethylene terephthalate. DSC measurement of this composition revealed that the temperature for the exothermic peak based on the crystallization was 212° C., and that the half width of the peak was 5.9° C.

EXAMPLE 6

(1) Reaction was conducted in the same manner as in Example 1-(1) using a mixture composed of 80 mol % of p-phenylenediamine and 20 mol% of 4,4'-diaminodiphenyl in place of p-phenylenediamine used in Example 1-(1). Thus, there was obtained 22.3 g of a product containing about 23% aromatic polyamido block component.

(2) DSC measurement of a kneaded blend of 2 g of the product and 50 g of polyethylene terephthalate revealed that the temperature for the exothermic peak based on the crystallization was 216° C., and that half width of the peak at this temperature was 5.7° C.

EXAMPLE 7

The same procedures as in Example 1-(1) were repeated on a 10-fold scale. The resulting product contained 24% poly-p-phenyleneterephthalamido component. 70 g of this product was kneaded with 1.5 kg of polyethylene terephthalate ($\eta$ sp/c=0.82) in a biaxial screw extruder, and the thus kneaded blend was kneaded with a 30% amount of glass fiber in a uniaxial screw extruder. The thus obtained resin was molded in a metal mold of a particular temperature as shown in Table 2 below.

Additionally, when the blend kneaded in the biaxial screw extruder was directly molded in a 120° C. or 110° C. metal mold, moldings were obtained with good parting properties and good appearance (both evaluated as A).

EXAMPLE 8

The same procedures as described in Example 4-(1) and -(2) were repeated on a 5-fold scale except for additionally using 500 g of nitrobenzene as a solvent for bishydroxyethyl terephthalate oligomer. The resulting product contained about 20% p-phenyleneterephthalamido component. 100 g of this product, 1.5 kg of polyethylene terephthalate ($\eta$ sp/c=0.82), and 680 g of glass fiber were kneaded in a uniaxial screw extruder, and the thus obtained resin was evaluated. Results thereof are given in Table 2.

EXAMPLE 9

The same experiment as described in Example 5-(1) was repeated on a 20-fold scale. The resulting product contained 22% poly-p-phenyleneterephthalamido component. This is kneaded with polyethylene terephthalate ($\eta$ sp/c=0.72) in a biaxial screw extruder, then compounded with 30% glass fiber followed by kneading in a uniaxial screw extruder. Results obtained by molding the thus obtained resin are shown in Table 2. Additionally, when the blend kneaded in the biaxial screw extruder was directly molded in a 110° C. metal mold, moldings were obtained with good parting properties and good appearance (both evaluated as A).

Example 10

The same experiment as described in Example 6-(1) was repeated on a 10-fold scale. 100 g of the resulting product (containing about 23% aromatic polyamido block component), 1.5 kg of polyethylene terephthalate ($\eta$ sp/c=0.78), and glass fiber were kneaded and molded in the same manner as in Example 7. Results thus obtained are shown in Table 2.

EXAMPLE 11

10.81 g of m-phenylenediamine (as a diamine component) was reacted with 21.11 g of terephthalic acid dichloride (as a dicarboxylic acid component) in the same manner as in Example 1-(1), using a solution of 1 liter of hexamethylphosphoramide, 1.5 liters of N-methylpyrrolidone, and 75 g of lithium chloride as a solvent. Then, 100 g of polyethylene terephthalate/-sebacate (molar ratio of terephthalic acid to sebacic acid=70/30; $\eta$ sp/c=0.38) was added to the solution as a copolymerizable polyester, and 20 g of a sodium hydride dispersion was further added thereto to conduct reaction for one day. Then, 200 ml of methanol was added thereto, and the resulting mixture was poured into a large amount of water. The precipitate thus formed was separated, washed, and dried. This product contained about 24% aromatic polyamido component. This was kneaded with 1.5 kg of polyethylene terephthalate ($\eta$ sp/c=0.76) in a biaxial screw extruder, then with a 30% amount of glass fiber in a uniaxial screw extruder. Results obtained by molding the thus obtained resin (in a 110° C. metal mold) are shown in Table 2.

EXAMPLES 12–16

The same procedures as described in Example 11 were conducted except for changing diamine, dicarboxylic acid, and polyester for copolymerization. Results thus obtained are shown in Table 3 below.

EXAMPLE 17

The same reaction as in Example 11 was carried out except for using 38.21 g of p-aminobenzoyl chloride hydrochloride as an aminocarboxylic acid component in place of the reaction product between the diamine component and the dicarboxylic acid component. Results thus obtained are shown in Table 2.

EXAMPLE 18

The same procedures as in Example 17 were conducted except for using a mixture of 19.11 g of p-aminobenzoyl chloride hydrochloride and 19.11 g of m-aminobenzoyl chloride hydrochloride in place of p-aminobenzoyl chloride hydrochloride. Results thus obtained are shown in Table 2.

TABLE 2

| Example | DSC Tc | ΔT | Metal Mold Temperature | Parting Properties | Appearance of Molding | Tensile Strength (kg/cm$^2$) |
|---|---|---|---|---|---|---|
| 7 | 213 | 5.8 | 100° C. | A | A | 1550 |
|   |     |     | 110° C. | A | A | 1560 |
| 8 | 211 | 5.9 | 110° C. | A | A | 1520 |
| 9 | 209 | 6.2 | 110° C. | A | A | 1540 |
| 10 | 207 | 6.5 | 110° C. | A | A | 1470 |
| 11 | 209 | 5.8 | 110° C. | A | A | 1530 |
| 17 | 208 | 6.3 | 110° C. | A | A | 1520 |
| 18 | 206 | 6.5 | 110° C. | A | A | 1530 |

TABLE 3

| Example | Diamine Component | Dicarboxylic Acid Component | Polyester for Copolymerization (molar ratio) | η sp/c | DSC Tc | DSC ΔT | Parting Properties | Appearance of Molding | Tensile Strength (kg/cm²) |
|---|---|---|---|---|---|---|---|---|---|
| 12 | (CH₃-substituted biphenyl diamine) 10.62 g + H₂N-C₆H₄-NH₂ 5.41 g | ClCO-C₆H₄-COCl (meta) | Polyethylene terephthalate/adipate (70/30) 100 g | 0.39 | 210 | 6.1 | A | A | 1570 |
| 13 | H₂N-C₆H₄-CH₂-C₆H₄-NH₂ 19.83 g | ClCO-C₆H₄-COCl 21.11 g | 100 g | | 215 | 5.8 | A | A | 1580 |
| 14 | H₂N-C₆H₄-O-C₆H₄-NH₂ 20.02 g | ClCO-C₆H₄-COCl | Polycaprolactone 20 g (m.w. 5000) | 0.38 | 213 | 5.9 | A | A | 1550 |
| 15 | H₂N-C₆H₄-SO₂-C₆H₄-NH₂ 24.80 g | ClCO-naphthalene-COCl 29.03 g | Polyethylene terephthalate/sebacate (65/35) 80 g | 0.35 | 208 | 6.3 | A | A | 1500 |
| 16 | H₂N-C₆H₄-NH₂ 10.81 g | ClCO-C₆H₄-O-CH₂CH₂O— 26.32 g | Polyethylene terephthalate/polytetramethylene 100 g | 0.45 | 212 | 6.1 | A | A | 1580 |

TABLE 3-continued
| Example | Diamine Component | Dicarboxylic Acid Component | Polyester for Copolymerization (molar ratio) | η sp/c | DSC Tc | DSC ΔT | Parting Properties | Appearance of Molding | Tensile Strength (kg/cm²) |
|---|---|---|---|---|---|---|---|---|---|
| | |  | glycol copolymer (PTMG* 50%) 100 g | | | | | | |
*PTMG represents polytetramethylene glycol.

EXAMPLE 19

(1) A 1-liter reactor equipped with a high-speed stirrer was well dried by introducing hot dry nitrogen gas thereinto, and then cooled. 100 ml of dry, purified hexamethylphosphoramide, 150 ml of N-methyl-2-pyrrolidone, and 8 g of anhydrous lithium chloride were charged therein, and 2.25 g of p-phenylenediamine was added thereto and completely dissolved therein.

Then, this solution was cooled to 5°–10° C. and, under vigorous stirring, 4.70 g of terephthalic acid dichloride was added thereto. After reacting for about one hour, the temperature of the solution was raised to 30°–40° C., reaction being continued for another one hour.

A part of the thus produced poly-p-phenyleneterephthalamide was taken out of the reaction system, precipitated in water, repeatedly washed with warm water, and dried for measuring viscosity. As a result, relative viscosity ($\eta$ rel) measured at 35° C. as a 0.5 g/100 ml solution in 97% conc. sulfuric acid was found to be 1.65.

(2) 25 g of polytetramethylene glycol and 10 ml of triethylamine were added to the above-described reaction mixture, and block polymer-forming reaction was conducted at 50° C. for one day and one night. After adding 20 g of a styrene-acrylonitrile copolymer (containing 5% acrylonitrile) to the reaction solution as a co-precipitating agent (dispersing aid), the resulting mixture was poured into water. The precipitate thus formed was washed, dried, and kneaded with 300 g of polyethylene terephthalate ($\eta$ sp/c=0.61). DSC measurement of the thus obtained composition revealed that Tc and $\Delta$T measured at a cooling rate of 10° C./min were 211° C. and 7.1° C., respectively. When this resin was molded in a 110° C. metal mold, there were obtained moldings with good parting properties and good appearance (both evaluated as A).

EXAMPLE 20

An aromatic polyamide solution was synthesized from 2.25 g of p-phenylenediamine and 4.6 g of terephthalic acid dichloride using the same reactor and solvents as used in Example 19. To the reaction mixture were added 8.1 g of adipic acid dichloride, 5.6 g of hexamethylenediamine, and 30 ml of triethylamine, and reaction was conducted for 5 hours. Then, 30 g of bishydroxyethyl terephthalate (polyethylene terephthalate oligomer) was added thereto and, after well mixing, the resulting mixture was poured into water. The precipitate thus formed was collected by filtration, washed, dried, and kneaded with 300 g of polyethylene terephthalate ($\eta$ sp/c=0.82). DSC measurement of this composition revealed that Tc and $\Delta$T measured at a cooling rate of 10° C./min were 212° C. and 6.9° C., respectively. When this was molded in a 110° C. metal mold, moldings were obtained with good parting properties and good appearance (both evaluated as A).

EXAMPLE 21

4.2 g of 4,4'-diaminodiphenylmethane was reacted with 4.5 g of terephthalic acid dichloride in the same manner as in Example 19. Then, 8.8 g of N,N'-dimethylethylenediamine was added thereto, and 10 g of isophthalic acid dichloride, 10 g of terephthalic acid dichloride, and 20 ml of triethylamine were added thereto to conduct block polymer-forming reaction. After 5 hours, 10 g of neopentyl glycol dibenzoate was added thereto, and the resulting mixture was mixed with a solution of 30 g of polyethylene terephthalate in o-chlorophenol, and thrown into methanol. The precipitate thus formed was washed, dried, and kneaded with 300 g of polyethylene terephthalate ($\eta$ sp/c=0.61). DSC measurement revealed that Tc and $\Delta$T of this composition measured at a cooling rate of 10° C./min were 216° C. and 7.3° C., respectively. When this was molded in a 110° C. metal mold, moldings were obtained with good parting properties and good appearance (evaluated as A).

EXAMPLE 22

(1) 400 ml of water, 6 g of thiourea, 80 ml of styrene, 20 ml of acrylonitrile, 5 ml of a 30% hydrogen peroxide aqueous solution, and 4 g of sodium laurylsulfate were mixed and subjected to polymerization for 18 hours at 50° C. to synthesize a styrene-acrylonitrile copolymer having amino or hydroxy group at terminal ends. After completion of the reaction, the product was washed and dried.

(2) 16 g of this copolymer was charged in the same reactor as in Example 19 (and 250 ml of N-methylpyrrolidone and 150 ml of dimethylacetamide were added thereto as solvents to dissolve the copolymer. Then, 1.6 g of isophthalic acid dichloride and 1 ml of triethylamine were added thereto and, after stirring at 5° C. for 1 hour, 0.82 g of m-phenylenediamine was further added thereto conduct reaction for 3 hours. The resulting reaction mixture was mixed with a solution of 20 g of polyethylene terephthalate in o-chlorophenol, then thrown into methanol to precipitate. The precipitate thus formed was washed, dried, and kneaded with 200 g of polyethylene terephthalate. DSC measurement of this composition revealed that Tc and $\Delta$T measured at a cooling rate of 10° C./min were 211° C. and 7.1° C., respectively.

EXAMPLE 23

(1) 19 g of p-aminobenzoic acid hydrochloride and 5 ml of triethylamine were charged and reacted for 3 hours using the same reactor and the same solvents as used in Example 19.

(2) Separately, 50 g of cellulose diacetate was dissolved in 250 ml of N-methylpyrrolidone, and 5 g of a sodium hydride dispersion was added thereto. After stirring the mixture for a while, the aromatic polyamide solution described in (1) was added thereto to conduct reaction for grafting the aromatic polyamide to cellulose diacetate. After 2 hours, 25 g of cellulose triacetate was dissolved therein as a dispersing aid followed by pouring the mixture into water. The precipitate thus formed was washed, dried, and kneaded with 1000 g of polyethylene terephthalate. DSC measurement revealed that Tc and $\Delta$T of this composition measured at a cooling rate of 10° C./min were 218° C. and 6.1° C., respectively. When this was molded in a 110° C. metal mold, moldings were obtained with good parting properties and good appearance (both evaluated as A).

EXAMPLE 24

(1) 19 g of p-aminobenzoic acid hydrochloride was reacted in the same manner as in Example 23-(1).

(2) Separately, 0.2 g of azobisisobutyronitrile was added to a mixture of 50 g of methyl methacrylate, 14 g of butyl methacrylate, and 1 g of methacrylic acid chloride to react at 50° C. for 4 hours. The reaction product was crushed in a dry box, and 30 g of the crushed product was charged in a 2-liter reactor and dissolved in 500 ml of dimethylacetamide. The aromatic polyamide solution obtained in (1) above was added thereto, and 10 ml of triethylamine was further added thereto to react for 4 hours. Thus, the aromatic polyamide was grafted to the methacrylatemethacrylic acid chloride copolymer. After the reaction, 40 g of polymethyl methacrylate was added thereto as a dispersing aid, and the resulting mixture was thrown into water. The precipitate thus formed was washed, dried, and kneaded with 930 g of polyethylene terephthalate. DSC measurement revealed that Tc and ΔT of this composition were 215° C. and 6.9° C., respectively. When this was molded in a 110° C. metal mold, moldings were obtained with good parting properties and good appearance (both evaluated as A).

EXAMPLE 25

10.81 g of p-phenylenediamine (as a diamine component) was reacted with 21.11 g of terephthalic acid dichloride (as a dicarboxylic acid component) in the same manner as in Example 19-(1), using 1 liter of hexamethylphosphoramide, 1.5 liters of N-methylpyrrolidone, and 75 g of lithium chloride as solvents. Then, 70 g of polytetramethylene glycol (m.w.=2000) was added thereto as a copolymerizable polymer, and 20 g of a sodium hydride dispersion was further added thereto to conduct reaction for one day. Then, 50 g of polyethylene terephthalate/sebacate (molar ratio of terephthalic acid to sebacic acid=60/40) was added thereto to dissolve, 200 ml of methanol was added thereto, and the resulting mixture was thrown into a large amount of water. The precipitate thus formed was washed and dried. This was kneaded with 1.5 kg of polyethylene terephthalate ($\eta$ sp/c=0.76) in a biaxial screw extruder, then kneaded with a given amount of glass fiber in a uniaxial screw extruder. Results obtained by molding the thus obtained resin in a 110° C. metal mold are shown in Table 4.

EXAMPLE 26

The same procedures as in Example 21 were conducted on a 5-fold scale, provided that polyethylene terephthalate of 0.76 in $\eta$ sp/c was used. After kneading in a biaxial screw extruder, the resulting blend was kneaded with a 30% amount of glass fiber in uniaxial screw extruder. Results obtained by molding the thus obtained resin in a 110° C. metal mold are shown in Table 4.

EXAMPLE 27

The same procedures as in Example 22 were conducted on a 10-fold scale, provided that polyethylene terephthalate of 0.72 in $\eta$ sp/c was used. After kneading in a biaxial screw extruder, the resulting blend was kneaded with a 25% amount of glass fiber in a uniaxial screw extruder. Results obtained by molding the thus obtained resin in a 110° C. metal mold are shown in Table 4.

EXAMPLES 28-31

(1) The same procedures as in Example 22-(1) were conducted except for using styrene alone. The resulting polystyrene having amino or hydroxy group at the terminal ends was used as a copolymerizable polymer in the following experiments.

(2) The same procedures as in Example 25 were conducted except for changing the diamine component and the dicarboxylic acid component and using the polystyrene described in (1) above as a copolymerizable polymer. Results thus obtained are shown in Table 5.

EXAMPLES 32-33

The same procedures as in Examples 28-31 were conducted except for using 38.20 g of p-aminobenzoic acid chloride hydrochloride in place of reacting the diamine component with the dicarboxylic acid component [Example 32]. Also, the procedures were conducted using 19.10 g of p-aminobenzoic acid chloride hydrochloride and 19.10 g of m-aminobenzoic acid chloride hydrochloride [Example 33]. Results thus obtained are shown in Table 5.

EXAMPLES 34-35

The same procedures as in Examples 23 and 24 were repeated on a 3-fold scale [Examples 34 and 35, respectively]. As the polyethylene terephthalate, polyethylene terephthalate of 0.72 in $\eta$ sp/c was used. After kneading in a biaxial screw extruder, the resulting blend was kneaded with a 30% amount of glass fiber using a uniaxial screw extruder. Results obtained by molding the thus obtained resin in a 110° C. metal mold are shown in Table 4.

EXAMPLE 36

The same procedures as in Example 34 were conducted except for using m-aminobenzoyl chloride hydrochloride in place of p-aminobenzoyl chloride hydrochloride and using polyethylene terephthalate/adipate (molar ratio of terephthalic acid to adipic acid=60/40) as a dispersing aid. Results thus obtained are shown in Table 4.

EXAMPLE 37

The same procedures as in Example 35 were conducted except for omitting butyl methacrylate and increasing the amount of methyl methacrylate to make up the amount of omitted butyl methacrylate. As a dispersing aid, polyethylene terephthalate/adipate (molar ratio of terephthalic acid to adipic acid=60/40) was used in place of polymethylmethacrylate. Results thus obtained are shown in Table 4.

TABLE 4

| Example | DSC Tc | ΔT | Glass Fiber % | Metal Mold Temp. | Parting Properties | Appearance of Molding | Tensile Strength (kg/cm$^2$) |
|---|---|---|---|---|---|---|---|
| 25 | 209 | 7.1 | 30 | 110° C. | A | A | 1610 |
|  |  |  | 20 | 110° C. | A | A | 1470 |
| 26 | 211 | 7.3 | 30 | 110° C. | A | A | 1620 |
| 27 | 208 | 7.3 | 25 | 110° C. | A | A | 1500 |
| 34 | 213 | 6.6 | 30 | 110° C. | A | A | 1570 |
| 35 | 211 | 7.1 | 30 | 110° C. | A | A | 1480 |
| 36 | 210 | 6.5 | 30 | 110° C. | A | A | 1580 |

TABLE 4-continued

| Example | DSC Tc | ΔT | Glass Fiber % | Metal Mold Temp. | Parting Properties | Appearance of Molding | Tensile Strength (kg/cm²) |
|---|---|---|---|---|---|---|---|
| 37 | 209 | 6.3 | 30 | 110° C. | A | A | 1520 |

TABLE 5

| Example | Diamine Component | Dicarboxylic Acid Component | Glass Fiber (%) | DSC Tc | ΔT | Parting Properties | Appearance of Molding | Tensile Strength (kg/cm²) |
|---|---|---|---|---|---|---|---|---|
| 28 | NH₂—⌬—O—⌬—NH₂ 19.83 g | ClCO—⌬—⌬—COCl 29.03 g | 30 | 209 | 6.3 | A | A | 1530 |
|  |  |  | 20 | 210 | 7.1 | A | A | 1450 |
| 29 | NH₂—(naphthalene)—NH₂ 15.82 g | ClCO—⌬—OCH₂— —CH₂O—⌬—COCl 35.28 g | 35 | 211 | 6.9 | A | A | 1600 |
| 30 | NH₂—⌬—SO₂—⌬—NH₂ 24.83 g | ClCO—⌬—COCl 21.11 g | 30 | 213 | 6.3 | A | A | 1520 |
| 31 | NH₂—⌬—SO₂—⌬—NH₂ 24.83 g | ClCO—(naphthalene)—COCl 26.32 g | 40 | 207 | 6.5 | A | A | 1650 |
| 32 | HCl.NH₂—⌬—COCl | 38.20 g | 30 | 207 | 6.5 | A | A | 1540 |
| 33 | HCl.NH₂—⌬—COCl  HCl.NH₂—⌬(COCl) | 19.10 g  19.10 g | 30 | 206 | 6.7 | A | A | 1520 |

EXAMPLE 38

(1) A 1-liter reactor equipped with a high-speed stirrer was well dried by introducing thereinto a hot dry nitrogen gas, and cooled. 100 ml of dry, purified hexamethylphosphoramide, 150 ml of N-methyl-2-pyrrolidone, and 8 g of anhydrous lithium chloride were charged therein and, after dissolving therein 9.7 g of isophthalic acid dihydrazide, the mixture was cooled to 5°–10° C. Then, 10.2 g of terephthalic acid dichloride was added thereto under vigorous stirring. After stirring for 1 hour, 5.6 g of trans-2,5-dimethylpiperidine was added thereto to dissolve, and 10.2 g of terephthalic acid dichloride was added thereto followed by reacting for about 2 hours. The reaction mixture was then poured into a large amount of water containing sodium carbonate in a slight amount. A precipitate thus formed was separated, washed, and dried. The product showed an intrinsic viscosity of 1.6 dl/g in hexamethylphosphoramide.

10 g of the resulting polyamidohydrazide was dissolved in 200 ml of hexamethylphosphoramide, 20 g of bishydroxyethyl terephthalate (polyethylene terephthalate oligomer) and 10 g of dibutyl phthalate were added thereto as dispersing aids, and the resulting solution was mixed with a solution of 30 g of polyethylene terephthalate in o-chlorophenol under stirring. This mixture was added to a methanol/water mixture solution to form a precipitate. The precipitate thus formed was washed, dried, and kneaded with 480 g of polyethylene terephthalate. The resulting blend contained about 1.9% o-chlorophenol-insoluble polyamidohydrazide. DSC measurement revealed that Tc of this composition measured at a cooling rate of 10° C./min was 210° C., and that a sharp exothermic peak was shown in this temperature range with ΔT of 7.4° C. When this resin was molded in a 110° C. metal mold, moldings were obtained with good parting properties and good appearance (both evaluated as A).

EXAMPLE 39

6.0 g of ethylenediamine, 16 g of sodium hydroxide, and 2 g of sodium laurylsulfate were dissolved in 200 ml of distilled water and 50 ml of dichloromethane. 20.3 g of terephthalic acid chloride in dichloromethane was added thereto under stirring. Stirring was continued for 10 minutes. The resulting mixture was added to acetone, and the precipitate thus formed was collected by filtration, washed, and dried. The thus obtained polyamide had an intrinsic viscosity of 0.9 dl/g.

10 g of the polyamide was dissolved in 300 ml of dimethylacetamide and 15 g of lithium chloride, and the resulting solution was added to o-chlorophenol containing 50 g of polyethylene terephthalate as a dispersing aid and vigorously stirred. This mixture was then mixed with a large amount of methanol, and the precipitate thus formed was collected by filtration, washed, dried, and kneaded with 650 g of polyethylene terephthalate. The thus obtained composition contained about 1.4% polyamide. DSC measurement revealed that Tc and $\Delta$T of this composition measured at a cooling rate of 10° C./min were 215° C. and 6.8° C., respectively. When this was molded in a 110° C. metal mold, moldings were obtained with good parting properties and good appearance (both evaluated as A).

EXAMPLE 40

(1) Polyamide (40-I) was prepared from 24.8 g of 4,4'-diaminodiphenylsulfone and 18.3 g of adipic acid dichloride, and polyamide (40-II) from 13.6 g of p-xylylenediamine and 18.3 g of adipic acid dichloride in the same manner as in Example 39.

(2) 5 g of each polyamide was dissolved in a solution of 200 ml of N-methylpyrrolidone and 10 g of calcium chloride. After mixing the solution with a solution of 30 g of polyethylene terephthalate (as a dispersing aid) in nitrobenzene, the resulting solution was poured into methanol. The precipitate thus formed was washed, dried, and kneaded with 200 g of polyethylene terephthalate. Polyamide content of the composition obtained from polyamide (40-I) was measured to be 2.1%, and that from polyamide (40-II) 2.1%. DSC measurement revealed that Tc and $\Delta$T of the composition from polyamide (40-I) measured at a cooling rate of 10° C./min were 216° C. and 6.2° C., respectively, and that Tc and $\Delta$T of the composition from polyamide (40-II) were 213° C. and 6.5° C., respectively. When these resins were molded in a 110° C. metal mold, moldings were obtained with good parting properties and good appearance (both evaluated as A).

EXAMPLE 41

The same reactor and the same solvents as used in Example 38 were used. 40 g of 3-aminocyclohexanecarbonylchloride hydrochloride was charged therein, and 10 ml of triethylamine was added thereto. After about 2 hours, the mixture was thrown into a large amount of water, and the precipitate thus formed was collected by filtration, washed, dried. 15 g of the resulting polyamide was dissolved in a solution of 400 ml of dimethylacetamide and 20 g of lithium chloride. Then, 10 g of poly-N,N'-dimethylethylenediamine terephthalate, 10 g of nylon 12, and 30 g of polymethyl methacrylate were dissolved therein as dispersing aids, and the resulting solution was mixed with a solution of 50 g of polyethylene terephthalate in o-chlorophenol followed by adding thereto methanol to precipitate. The precipitate thus formed was collected by filtration, washed, dried, and kneaded with 650 g of polyethylene terephthalate. DSC measurement revealed that Tc and $\Delta$T of the thus obtained composition measured at a cooling rate of 10° C./min were 213° C. and 6.6° C., respectively. When this was molded in a 110° C. metal mold, there were obtained moldings with good parting properties and good appearance (both evaluated as A).

EXAMPLE 42

A polyamide was prepared from 6.2 g of tetramethylenediamine and 14.2 g of terephthalic acid dichloride in the same manner as in Example 38.

5 g of this polyamide was dissolved in a solution of 200 ml of N-methylpyrrolidone and 10 g of lithium chloride, and 30 g of polyoxyethylene nonylphenol ether and 10 g of bishydroxyethyl terephthalate (polyethylene terephthalate oligomer) were added thereto as dispersing aids, and the resulting solution was thrown into water under vigorous stirring. The precipitate thus formed was collected by filtration, washed with successive, methanol and acetone, and finally dispersed in o-chlorophenol. 50 g of polyethylene terephthalate was dissolved therein, and the resulting mixture was poured into methanol. The precipitate thus formed was collected by filtration, dried, and kneaded with 250 g of polyethylene terephthalate. DSC measurement revealed that Tc and $\Delta$T of the resulting composition measured at a cooling rate of 10° C./min were 216° C. and 6.6° C., respectively. When this was molded in a 110° C. metal mold, moldings were obtained with good parting properties and good appearance (both evaluated as A).

EXAMPLE 43

A polyamide was prepared in the same manner as in Example 38 except for using 5.8 g of hexamethylenediamine and 10.2 g of terephthalic acid dichloride. 40 g of polymethyl methacrylate and 5 g of triphenyl phosphate were dissolved in the resulting polyamide solution as dispersing aids, and this solution was mixed with water under vigorous stirring. The precipitate thus formed was washed, dried, and kneaded with 960 g of polyethylene terephthalate. The resulting composition contained about 1.2% polyamide. DSC measurement revealed that Tc and $\Delta$T of the composition measured at a cooling rate of 10° C./min were 213° C. and 6.0° C., respectively. When this was molded in a 110° C. metal mold, moldings were obtained with good parting properties and good appearance (both evaluated as A).

EXAMPLE 44

The same reactor and the same solvents as used in Example 38 were used. 3 g of ethylenediamine was dissolved therein, and 10.6 g of terephthalic acid chloride was added thereto to react for 1 hour. Then, 20 g of polycarprolactone (as a copolymerizable polymer) and 5 ml of triethylamine were added thereto, and block polymer-forming reaction was conducted at 100° C. for 24 hours. 40 g of styrene-acrylonitrile copolymer was added to the resulting solution as a dispersing aid followed by pouring the solution into water. The precipitate thus formed was collected by filtration, washed, dried, and kneaded with 950 g of polyethylene terephthalate. DSC measurement revealed that Tc and $\Delta$T of the thus obtained composition measured at a cooling rate of 10° C./min were 213° C. and 6.8° C., respectively. When this was molded in a 110° C. metal mold, moldings were obtained with good parting properties and good appearance (both evaluated as A).

EXAMPLE 45

Ethylenediamine was reacted with terephthalic acid chloride in the same manner as in Example 44, and 12.4 g of ethylene glycol and 8.5 g of a sodium hydride dispersion were added thereto. After one hour, 42.2 g of terephthalic acid dichloride was added thereto, and the reaction was continued for 4 hours. Then, 5 g of phenol was added thereto and, after reacting for 2 hours, the reaction mixture was poured into a large amount of methanol to form a precipitate. The precipitate was washed, dried, and kneaded with 600 g of polyethylene terephthalate. DSC measurement revealed that Tc and $\Delta T$ of this composition measured at a cooling rate of 10° C./min were 218° C. and 5.9° C., respectively. When this was molded in a 110° C. metal mold, moldings were obtained with good parting properties and good appearance (both evaulated as A).

EXAMPLE 46

Ethylenediamine was reacted with terephthalic acid chloride in the same manner as in Example 44, and 8.8 g of N,N'-dimethylethylenediamine, 9.9 g of terephthalic acid dichloride, and 9.9 g of isophthalic acid dichloride to prepare a block copolymer between polyethylene terephthalamide and low-melting N-methylated polyamide. After conducting the reaction for 2 hours, the reaction mixture was poured into a large amount of water. The precipitate thus formed was washed, dried, mixed with 200 g of bishydroxyethyl terephthalate (polyethylene terephthalate oligomer), and charged in a 1-liter reactor. The mixture was gradually heated in a nitrogenous atmosphere until the temperature finally reached 285° C. under high vacuum to polymerize polyethylene terephthalate. Then, 450 g of polyethylene terephthalate was added to the resulting master batch followed by kneading the mixture. DSC measurement revealed that Tc and $\Delta T$ of the thus obtained composition measured at a cooling rate of 10° C./min were 212° C. and 6.3° C., respectively. When this was molded in a 110° C. metal mold, moldings were obtained with good parting properties and good appearance (both evaluated as A).

EXAMPLE 47

(1) 300 g of styrene, 11.2 g of bis-4-aminophenyldisulfide, and 0.15 g of azobisisobutyronitrile were charged in a nitrogen-purged polymerization reactor, and polymerization was carried out at 50° C. for 15 hours. The reaction mixture was poured into methanol, and the precipitate thus formed was collected by filtration, and washed.

(2) 15 g of the polystyrene obtained in (1) having amino group at the terminal ends was charged in the reactor used in Example 38, and a solution of 100 ml of N-methylpyrrolidone, and 6 g of lithium chloride was used as a solvent to dissolve the polystyrene. Then, 4.1 g of terephthalic acid dichloride and 2 ml of triethylamine were added thereto and, after reacting at 10° C. for 1 hour, 1.2 g of ethylenediamine was further added thereto and the reaction was continued for 2 hours. 20 g of ethyl cellulose was added thereto as a dispersing aid, and a large amount of methanol was added thereto to form a precipitate. The precipitate thus formed was washed, dried, and kneaded with 200 g of polyethylene terephthalate. DSC measurement of this composition revealed that Tc and $\Delta T$ measured at a cooling rate of 10° C./min were 215° C. and 6.6° C., respectively. When this was molded in a 110° C. metal mold, moldings were obtained with good parting properties and good appearance (both evaluated as A).

EXAMPLE 48

Ethylenediamine was reacted with terephthalic acid dichloride in the same manner as in Example 44. Then, 0.2 g of terephthalic acid dichloride was added, and 40 g of polytetramethylene glycol and 4 ml of triethylamine were added thereto to react at 50° C. for one day and one night. 30 g of cellulose diacetate was added thereto as a dispersing aid, and the resulting mixture was poured into methanol. The precipitate thus formed was washed, dried, and kneaded with 500 g of polyethylene terephthalate. DSC measurement revealed that Tc and $\Delta T$ of the thus obtained composition measured at a cooling rate of 10° C./min were 210° C. and 7.0° C., respectively. When this was molded in a 110° C. metal mold, moldings were obtained with good parting properties and good appearance (both evaluated as A).

EXAMPLE 49

(1) A polyamide was prepared from 20 g of 4-aminocyclohexanecarbonyl chloride hydrochloride in the same manner as in Example 41.

(2) Separately, 50 g of cellulose diacetate was dissolved in 250 ml of N-methylpyrrolidone, and 5 g of a sodium hydride dispersion was added thereto. After stirring the mixture for a while, the polyamide solution prepared in (1) was added thereto to conduct reaction of grafting the polyamide to the cellulose diacetate. After one hour, the reaction mixture was poured into methanol. The precipitate thus formed was collected by filtration, dried, and kneaded with 1000 g of polyethylene terephthalate. DSC measurement revealed that Tc and $\Delta T$ of the thus obtained composition measured at a cooling rate of 10° C./min were 219° C. and 6.1° C., respectively. When this was molded in a 110° C. metal mold, moldings were obtained with good parting properties and good appearance (both evaluated as A).

EXAMPLE 50

0.2 g of azobisisobutyronitrile was added to a mixture solution of 50 g of methyl methacrylate, 24 g of ethyl methacrylate, and 1 g of acrylic acid chloride, and reaction was conducted at 50° C. for 4 hours. The reaction product was crushed in a dry box, charged in the same reactor as in Example 38, and dissolved in 500 ml of dimethylacetamide. 20 g of p-aminomethylbenzoyl chloride hydrochloride was added thereto, and 10 ml of triethylamine was further added thereto followed by reacting for 4 hours to graft the polyamide to the methacrylateacryloyl chloride copolymer. After the reaction, the reaction mixture was poured into water, washed, dried, and kneaded with 930 g of polyethylene terephthalate. DSC measurement revealed that Tc and $\Delta T$ of the thus obtained composition were 217° C. and 6.1° C., respectively. When this was molded in a 110° C. metal mold, moldings were obtained with good parting properties and good appearance (both evaluated as A).

EXAMPLES 51-63

The procedures in Examples 38-50 were conducted on a 3- to 10-fold scale (corresponding to Examples 51-63, respectively). As polyethylene terephthalate, those shown in Table 6 were used. After kneading the mixture in a biaxial screw extruder, the resulting blend was kneaded with a given amount of glass fiber in a uniaxial screw extruder. Results obtained by molding the thus obtained resins are given in Table 6.

TABLE 6

| Example | Scale of Experiment | η sp/c of PET | Glass Fiber (%) | Metal Mold Temp. (°C.) | DSC Tc | DSC ΔT | Parting Properties | Appearance of Molding | Tensile Strength (kg/cm²) |
|---|---|---|---|---|---|---|---|---|---|
| 51 | 5-fold scale of Ex. 38 | 0.82 | 35 | 100 | 213 | 6.9 | A | A | 1480 |
| 52 | 3-fold scale of Ex. 39 | 0.72 | 45 | 110 | 212 | 7.2 | A | A | 1620 |
| 53 | 6-fold scale Ex. 40 Polyamide (40-I) | 0.72 | 25 | 110 | 213 | 6.5 | A | A | 1430 |
|  | 6-fold scale Ex. 40 Polyamide (40-II) | 0.76 | 20 | 110 | 210 | 6.7 | A | A | 1370 |
| 54 | 3-fold scale of Ex. 41 | 0.76 | 30 | 110 | 209 | 7.0 | A | A | 1400 |
| 55 | 8-fold scale of Ex. 42 | 0.76 | 50 | 110 | 212 | 6.7 | A | A | 1630 |
| 56 | 3-fold scale of Ex. 43 | 0.76 | 35 | 110 | 211 | 6.2 | A | A | 1480 |
| 57 | 3-fold scale of Ex. 44 | 0.72 | 30 | 110 | 213 | 6.9 | A | A | 1560 |
| 58 | 4-fold scale of Ex. 45 | 0.82 | 30 | 110 | 218 | 5.9 | A | A | 1540 |
| 59 | 5-fold scale of Ex. 46 | 0.76 | 30 | 110 | 211 | 6.4 | A | A | 1580 |
| 60 | 10-fold scale of Ex. 47 | 0.72 | 30 | 110 | 214 | 6.6 | A | A | 1550 |
| 61 | 4-fold scale of Ex. 48 | 0.76 | 30 | 110 | 210 | 7.0 | A | A | 1530 |
| 62 | 3-fold scale of Ex. 49 | 0.76 | 30 | 110 | 218 | 6.1 | A | A | 1580 |
| 63 | 3-fold scale of Ex. 50 | 0.76 | 30 | 110 | 216 | 6.1 | A | A | 1520 |

EXAMPLES 64–66

The same procedures as in Example 43 were conducted except for changing the diamine component, dicarboxylic acid component, and dispersing aid. After kneading the product with 2 kg of polyethylene terephthalate ($\eta$ sp/c=0.76) in a biaxial screw extruder, the resulting blend was kneaded with a 30% amount of glass fiber in a uniaxial screw extruder. Results obtained by molding the thus obtained resins are shown in Table 7. Additionally, polyethylene terephthalate/adipate used as a dispersing aid was a copolyester of 60/40 in a molar ratio of terephthalic acid to adipic acid, polyethylene terephthalate/sebacate a copolyester of 60/40 in a molar ratio of terephthalic acid to sebacic acid, and copolyester of polyethylene terephthalate/adipate and polytetramethylene glycol a polyester of 70/30 in a molar ratio of terephthalic acid to adipic acid and 20% in a content of polytetramethylene glycol (abbreviated as PET/AD/PTG).

EXAMPLE 67

The same procedures as in Example 47-(2) were conducted on a 10-fold scale except for changing ethylene diamine, terephthalic acid dichloride, and dispersing aid to those given in Table 7. After kneading the product with 2 kg of polyethylene terephthalate ($\eta$ sp/c=0.76) in a biaxial screw extruder, the resulting blend was kneaded with a 30% amount of glass fiber in a uniaxial screw extruder. Results thus obtained by molding the resins are shown in Table 7. Additionally, the dispersing aid used here is the same as used in Example 64.

EXAMPLE 68

The same procedures as in Example 44 were conducted except for changing the diamine component, dicarboxylic acid component, and copolymerizable polymer. After kneading the product with 2 kg of polyethylene terephthalate ($\eta$ sp/c=0.76) in a biaxial screw extruder, the resulting blend was kneaded with a 30% amount of glass fiber. Results obtained by molding the thus obtained resin are shown in Table 7. Additionally, the styrene-acrylonitrile copolymer was not used as a dispersing aid. As the copolymerizable polymer, 100 g of polyethylene terephthalate/adipate (molar ratio of terephthalic acid to adipic acid=60/40; $\eta$ sp/c=0.39) was used.

EXAMPLE 69

0.2 g of azobisisobutyronitrile was added to a mixture solution of 100 g of styrene, 25 g of methyl methacrylate, and 2 g of methacrylic acid chloride, and reaction was conducted at 50° C. for 4 hours. The reaction product was pulverized in a dry box and dissolved in a 1.5 liters of dimethylacetamide. 6.01 g of ethylenediamine was added thereto, then 17.76 g of terephthalic acid dichloride was added thereto to conduct reaction at 10° C. for 4 hours. Finally, 1.5 g of benzoic acid chloride was added thereto, and reaction was conducted for 2 hours. Then, 50 g of polyethylene terephthalate/sebacate (molar ratio of terephthalic acid to sebacic acid=60/40) was dissolved therein as a dispersing aid followed by pouring the resulting mixture into water. The precipitate thus formed was washed, dried, kneaded with 2 kg of polyethylene terephthalate ($\eta$ sp/c=0.72) in a biaxial screw extruder, then kneaded with a 30% amount of glass fiber in a uniaxial screw extruder. Results thus obtained are shown in Table 7.

TABLE 7

| Example | Diamine Component | Dicarboxylic Acid Component | Dispersing Aid | Metal Mold Temp. (°C.) | DSC Tc | DSC ΔT | Parting Properties | Appearance of Molding | Tensile Strength (kg/cm²) |
|---|---|---|---|---|---|---|---|---|---|
| 64 | H₂N–C₆H₄–O–C₆H₄–NH₂  20.02 g | ClCO(CH₂)₇COCl  18.30 g | Polyethylene terephthalate/ adipate  100 g | 110 | 210 | 6.2 | A | A | 1570 |
| 65 | (3,3'-dimethyl-4,4'-biphenyldiamine)  21.23 g | ClCO(CH₂)₇COCl  18.30 g | Polyethylene terephthalate/ sebacate  100 g | 110 | 208 | 6.5 | A | A | 1560 |
| 66 | NH₂(CH₂)₇NH₂  8.82 g | ClCO–C₆H₄–C₆H₄–COCl  27.91 g | PET/AD/PTG  100 g | 110 | 209 | 6.5 | A | A | 1560 |
| 67 | H₂N–C₆H₄–CH₂–C₆H₄–NH₂  19.83 g | ClCO(CH₂)₄COCl  19.04 g | Polyethylene terephthalate/ adipate  100 g | 110 | 208 | 6.3 | A | A | 1580 |
| 68 | NH₂–CH₂CH₂–NH₂  6.01 g | ClCO–C₆H₄–COCl  21.11 g | — | 110 | 213 | 5.9 | A | A | 1580 |
| 69 | NH₂–CH₂CH₂–NH₂  6.01 g | ClCO–C₆H₄–COCl  17.76 g | Polyethylene terephthalate/ sebacate  50 g | 110 | 209 | 6.4 | A | A | 1520 |

While the invention has been described in detail and with reference to specific embodiments thereof, it will be apparent to one skilled in the art that various changes and modifications can be made therein without departing from the spirit and scope thereof.

What is claimed is:

1. A polyester composition comprising:
   (A) 100 parts by weight of a polyester comprising mainly polyethylene terephthalate and having a reduced specific viscosity ($\eta$ sp/c) of at least 0.3; and
   (B) from 0.05 to 10 parts by weight of at least one polyamide compound having a melting point of at least 300° C. selected from (i) and (ii):
      (i) at least one polyamide compound selected from polyamidohydrazides having a structure such that organic groups are linked to each other through amido bonds and hydrazido bonds, polyhydrazides having a structure such that organic groups are linked to each other through hydrazido bonds, and polyamides having a structure such that organic groups are linked to each other through amido bonds wherein organic groups other than aromatic groups are contained therein at least in part; and
      (ii) at least one polyamide compound containing an aromatic polyamido moiety comprising at least one of (1) a diamine group represented by the formula (I)

$$-NH-Ar_1-NH- \quad (I)$$

wherein $Ar_1$ represents a divalent aromatic group; (2) a dicarboxylic acid group represented by the formula (II)

$$-CO-Ar_2-CO- \quad (II)$$

wherein $A_2$ represents a divalent aromatic group; and (3) an aminocarboxylic acid group represented by the formula (III)

$$-NH-Ar_3-CO- \quad (III)$$

wherein $Ar_3$ represents a divalent aromatic group; linked to each other through amido bonds, and wherein said aromatic polyamido moiety is bound to a polymer other than an aromatic polyamido moiety, wherein said component (B) is uniformly dispersed in said component (A) in a substantial size of 50 μm or less, and a half width of an exothermic peak of the polyester composition measured in a crystallization temperature range by a differential scanning calorimeter at a cooling rate of 10° C./min. is 15° C. or less per 8 mg of said component (A).

2. A composition as in claim 1, wherein said polyamide compound (i) of component (B) is a polyamide, polyamidohydrazide, or polyhydrazide formed by at least one of (1) an amido unit represented by the formula (IV)

$$-NH-Ar_4-NH-CO-R_1-CO- \quad (IV)$$

wherein $Ar_4$ represents a divalent aromatic group, a divalent aralkyl group, a divalent cycloalkyl group, a methylene group or an ethylene group, and $R_1$ represents a divalent alkyl group having up to 8 carbon atoms or a divalent cycloalkyl group: (2) an amido unit represented by the formula (V)

$$-NH-R_2-NHCO-Ar_5-CO- \quad (V)$$

wherein $Ar_5$ represents a divalent aromatic group, a divalent aralkyl group, a divalent cycloalkyl group, a methylene group or an ethylene group, and $R_2$ represents a divalent alkyl group having up to 10 carbon atoms or a divalent cycloalkyl group; (3) an amido unit represented by the formula (VI)

$$-NH-R_3-CO \quad (VI)$$

wherein $R_3$ represents a divalent cycloalkyl group, a divalent aralkyl group, a cycloalkylmethylene group, a methylene group or ethylene group; (4) a hydrazido unit represented by the formula (VII)

$$-NHNH-CO-Ar_6-CO \quad (VII)$$

wherein $Ar_6$ represents a divalent aromatic group, a divalent cycloalkyl group or a divalent alkyl group having up to 4 carbon atoms; and (5) an amido unit represented by the formula (VIII)

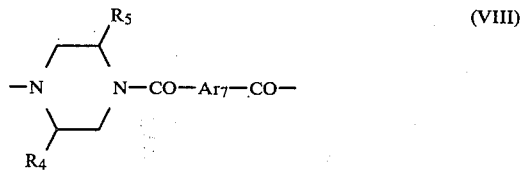

(VIII)

wherein $Ar_7$ represents a divalent aromatic residue, and $R_4$ and $R_5$ each represents hydrogen or a methyl group.

3. A composition as in claim 1, wherein said polyamide compound (i) of component (B) is a polyamide compound wherein the polyamido moiety, polyamidohydrazido moiety or polyhydrazido moiety comprising organic groups linked to each other through amido bonds, hydrazido bonds, or both, and having a melting point of higher than 300° C. is bound to another polymer.

4. A composition as in claim 1, wherein said polymer other than aromatic polyamido moiety is a polyester.

5. A composition as in claim 1, wherein said half width is 10° C. or less.

6. A composition as in claim 1 containing from 0.1 to 5 parts by weight of polyamide component (B) per 100 parts by weight of component (A).

7. A composition as in claim 1, which further contains at least 2 to 200 parts by weight of (C) reinforcing filler per 100 parts by weight of component (A).

8. A composition as in claim 7, wherein said reinforcing filler (C) is glass fiber.

9. A process for preparing a polyester composition comprising:
   (A) 100 parts by weight of a polyester comprising mainly polyethylene terephthalate and having a reduced specific viscosity ($\eta$ sp/c) of at least 0.3; and
   (B) from 0.05 to 10 parts by weight of at least one polyamide compound having a melting point of at least 300° C. selected from (i) and (ii):
      (i) at least one polyamide compound selected from polyamidohydrazides having a structure such that organic groups are linked to each other through amido bonds and hydrazido bonds, polyhydrazides having a structure such that organic groups are linked to each other through hydrazido bonds, and polyamides having a structure such that organic groups are linked to each other through amido bonds wherein organic groups other than aromatic groups are contained therein at least in part; and (ii) at least one polyamide compound containing an aromatic polyamido moiety comprising at least one of (1) a diamine group represented by the formula (I)

—NH—Ar$_1$—NH—     (I)

wherein Ar$_1$ represents a divalent aromatic group; (2) a dicarboxylic acid group represented by the formula (II)

—CO—Ar$_2$—CO—     (II)

wherein A$_2$ represents a divalent aromatic group; and (3) an aminocarboxylic acid group represented by the formula (III)

—NH—Ar$_3$—CO—     (III)

wherein Ar$_3$ represents a divalent aromatic group; linked to each other through amido bonds, and wherein said aromatic polyamido moiety is bound to a polymer other than an aromatic polyamido moiety, which comprises dissolving or suspending said at least one polyamide in a solvent, mixing therewith from 0.5 to 10 parts by weight of a dispersing aid per part by weight of said polyamide compound, conducting co-precipitation of component (B) and the dispersing aid, and dispersing the precipitate in a polyester comprising mainly polyethylene terephthalate having a reduced specific viscosity ($\eta$ sp/c) of at least 0.3, wherein component (B) is uniformly dispersed in said component (A) in a substantial size of 50 $\mu$m or less, and a half width of an exothermic peak of the polyester composition measured in a crystallization temperature range by a differential scanning colorimeter at a cooling rate of 10° C./min. is 15° C. or less per 8 mg of said component (A).

10. A process for manufacturing moldings by melting a polyester comprising mainly polyethylene terephthalate and having a reduced viscosity ($\eta$ sp/c) of at least 0.3, and molding it using a mold, which comprises uniformly dispersing, prior to melting, from 0.05 to 10 parts by weight, per 100 parts by weight of said polyester, of at least one polyamide compound having a melting point of at least 300° C. selected from (i) and (ii):

(i) at least one polyamide compound selected from polyamidohydrazides having a structure such that organic groups are linked to each other through amido bonds and hydrazido bonds, polyhydrazides having a structure such that organic groups are linked to each other through hydrazido bonds, and polyamides having a structure such that organic groups are linked to each other through amido bonds wherein organic groups other than aromatic groups are contained therein at least in part; and (ii) at least one polyamide compound containing an aromatic polyamido moiety comprising at least one of (1) a diamine group represented by the formula (I)

—NH—Ar$_1$—NH—     (I)

wherein Ar$_1$ represents a divalent aromatic group; (2) a dicarboxylic acid group represented by the formula (II)

—CO—Ar$_2$—CO—     (II)

wherein A$_2$ represents a divalent aromatic group; and (3) an aminocarboxylic acid group represented by the formula (III)

—NH—Ar$_3$—CO—     (III)

wherein Ar$_3$ represents a divalent aromatic group; linked to each other through amido bonds, and wherein said aromatic polyamido moiety is bound to a polymer other than an aromatic polyamido moiety, in said polyester in a substantial size of 50 $\mu$m or less, wherein a half width of an exothermic peak of the polyester composition measured in a crystallization temperature range by a differential scanning calorimeter at a cooling rate of 10° C./min. is 15° C. or less per 8 mg of said component (A).

11. A process as in claim 10, wherein molding is conducted at a metal mold temperature of 120° C. or less.

12. A composition as in claim 7 or 8 wherein the amount of reinforcing fiber is from 4 to 100 parts by weight per 100 parts by weight of component (A).

13. A polyester composition as in claim 1, wherein said other polymer is selected from the group consisting of polyesters, polymethacrylates, polystyrenes, and cellulose derivatives.

14. A composition as in claim 1, wherein said polyamide compound is selected from said polyamidohydrazides having a structure such that organic groups are linked to each other through amido bonds and hydrazido bonds.

15. A composition as in claim 1, wherein said polyamide compound is selected from said polyhydrazides having a structure such that organic bonds are linked to each other through hydrazido bonds.

16. A composition as in claim 1, wherein said polyamide compound is selected from said polyamides having a structure such that organic groups are linked to each other through amido bonds wherein organic groups other than aromatic groups are contained therein at least in part.

17. A composition as in claim 1, wherein said polyamide compound is selected from said polyamide compound containing an aromatic polyamido moiety.

18. A process as in claim 9, wherein said polyamide compound is selected from said polyamidohydrazides having a structure such that organic groups are linked to each other through amido bonds and hydrazido bonds.

19. A process as in claim 9, wherein said polyamide compound is selected from said polyhydrazides having a structure such that organic bonds are linked to each other through hydrazido bonds.

20. A process as in claim 9, wherein said polyamide compound is selected from said polyamides having a structure such that organic groups are linked to each other through amido bonds wherein organic groups other than aromatic groups are contained therein at least in part.

21. A process as in claim 9, wherein said polyamide compound is selected from said polyamide compound containing an aromatic polyamido moiety.

22. A process as in claim 10, wherein said polyamide compound is selected from said polyamidohydrazides having a structure such that organic groups are linked to each other through amido bonds and hydrazido bonds.

23. A process as in claim 10, wherein said polyamide compound is selected from said polyhydrazides having a structure such that organic bonds are linked to each other through hydrazido bonds.

24. A process as in claim 10, wherein said polyamide compound is selected from said polyamides having a structure such that organic groups are linked to each other through amido bonds wherein organic groups other than aromatic groups are contained therein at least in part.

25. A process as in claim 10, wherein said polyamide compound is selected from said polyamide compound containing an aromatic polyamido moiety.

26. A composition as in claim 17, wherein the proportion of the aromatic polyamido moiety in the polyamide is from about 10 to about 70%.

27. A process as in claim 9, wherein the proportion of the aromatic polyamido moiety in the polyamide is from about 10 to about 70%.

28. A process as in claim 10, wherein the proportion of the aromatic polyamido moiety in the polyamide is from about 10 to about 70%.

29. A process as in claim 10, wherein said molding is injection molding.

\* \* \* \* \*